(12) United States Patent
Coppens et al.

(10) Patent No.: US 7,241,462 B2
(45) Date of Patent: Jul. 10, 2007

(54) PROCESS FOR THE PREPARATION OF MALTED CEREALS

(76) Inventors: Theo Coppens, Nieuwstraaat, 37 B - 3120, Tremelo (BE); Jan Delcour, Kastanjelaan, 14 B - 3001, Heverlee (BE); Dirk Iserentant, Molenstraat, 40 B - 3018, Wijgmaal (BE)

( * ) Notice: Subject to any disclaimer, the term of this patent is extended or adjusted under 35 U.S.C. 154(b) by 1131 days.

(21) Appl. No.: 08/898,736

(22) Filed: Jul. 23, 1997

(65) Prior Publication Data

US 2001/0001673 A1    May 24, 2001

Related U.S. Application Data

(63) Continuation-in-part of application No. PCT/BE96/00077, filed on Jul. 23, 1996.

(51) Int. Cl.
*C12C 1/00* (2006.01)

(52) U.S. Cl. .............................. 426/28; 426/52; 426/60

(58) Field of Classification Search ................... 426/28, 426/52, 60
See application file for complete search history.

(56) References Cited

U.S. PATENT DOCUMENTS 5,312,630 A    5/1994   Pfaff ........................... 426/46
5,955,070 A *   9/1999   Boivin et al. .............. 424/93.5

FOREIGN PATENT DOCUMENTS

JP           55096092     *   7/1980

OTHER PUBLICATIONS

Gyllang et al, The influence of some fungi on malt quality., Proceedings, European Brewery Convention, 1977, pp. 245-254.*
Abstract of Jap. Pat. No. 406153896A, Soga et al, Jun. 1994.*
Abstract of Jap. Pat. No. 363094968A, Hirai, Apr. 1988.*
Abstract of Jap. Pat. No. 357033593, Tanaka et al, Feb. 1982.*
Abstract of Jap. Pat. No. 354064697A, Yoshizawa et al, May 1979.*

* cited by examiner

*Primary Examiner*—Milton I. Cano
*Assistant Examiner*—Sarah L. Kuhns
(74) *Attorney, Agent, or Firm*—Fitch, Even, Tabin & Flannery

(57) ABSTRACT

Process for the preparation of malted cereals, wherein the steeping step includes one or more wetting stages at a temperature between 5 and 30° C. preferably between 10 and 20° C., until the material has a moisture content between 20 and 60% by weight, preferably between 38 and 47%, wherein after a germination period between 2 and 7 days, preferably between 3 to 6 days at a temperature between 10 and 30° C., preferably between 14 and 18° C., the steeped and germinated cereals are preferably kilned by increasing the temperature to values between 40 and 150° C. until the material has a moisture content between 2 and 15% by weight, and wherein one or more microbial cultures selected from the group consisting of one or more bacteria and/or one of more activated spores are added in one or more times during the process.

67 Claims, 5 Drawing Sheets

PROCESS FOR THE PREPARATION OF MALTED CEREALS

This application is a continuation-in-part of International application PCT/BE96/00077 filed Jul. 23, 1996 and designating the United States.

FIELD OF THE INVENTION

The present invention is related to an improved process for the preparation of malted cereals, the improved malted cereals obtained and their use, especially In biotechnological processes for the preparation of beverages.

TECHNOLOGICAL BACKGROUND OF THE INVENTION

Cereals, such as barley, wheat, rye, corn, oats, rice, millet triticale, and sorghum, are used for the production of beverages. In most cases, they have been subjected to a malting process to take advantage of their increased enzymatic potential.

In traditional malting processes, the moisture content of cereals is raised either by immersion(s) and/or spraying(s), and the resulting high-moisture content cereal is allowed to germinate. After reaching the proper physiological condition, it is preferably submitted to (a) drying step(s). In what follows, the term steeping refers to the increase in moisture level, while the term germination is used in the way it is in plant physiology. The drying operations are referred to as kilning and the term malting involves all operations needed to convert barley (or other cereals) to barley malts (or other cereal malts).

The quality of the malt obtained is, to a large extent, determined by the presence of plant endogenous enzymes generated during the melting process. For instance, with cereals like barley used as a raw material for the malt production, the variety, the composition of the microbial flora and the environmental factors, such as agricultural practice, influence the quality of the malt. During cultivation and storage, cereals are contaminated with bacteria and fungi. In the malting plant, neither the air, the water, nor the equipment are sterile, and the conditions of humidity, pH and temperature favor the growth of the microbial populations. To improve the quality of malted cereals, such as barley, enzymes have been added to the malted cereal.

The variable cereal quality and the lack of means to make up for deficiencies during the malting process result in variability in malt quality and enzymatic activity. In many instances, this has to do with an imbalance of specific enzymatic potential and insufficient cell wall degradation. Apart from this, problems with microbial safety can occur. As a consequence of the defects in malt, quality problems occur in the production of beer, such as a poor filtration of the wort.

STATE OF THE ART

During the malting of cereals, the microflora present on the cereals develops and the quality of the malt and beverages is influenced by the activity of the latter microorganisms.

In analogy with other biotechnological processes, there have been attempts to optimize malt quality aspects by the addition of starter cultures during the malting process (Boivin, P. & Malanda, M., Influence of Starter Cultures in Malting on the Microflora Development and Malt Quality, EBC, Proceedings of the 24th Congress, pp. 95-102 (1993); Haikara, A. et al., Lactic Starter Cultures in Malting—A Novel Solution to Gushing Problems, European Brewery Convention, Proceedings of the 24th Congress, pp. 163-172 (1993)).

Addition of spores of *Geotrichum candidum* to the steeping water results in the inhibition of the development of undesirable microorganisms and in a decrease of the filtration time of wort made of the obtained malt. Treatment with *Geotrichum candidum* also inhibits the formation of mycotoxins by *Fusarium* spp.

The influence of *Lactobacillus plantarum* and *Pediococcus pentosaceus* has been tested on the microflora during malting, and it has been found that these cultures act as natural preservations as they restrict the growth of *Fusarium* and prevent gushing.

The international patent application WO 94/29430 describes a process for improving the properties of malted cereals wherein starter cultures which comprise moulds, yeasts or bacteria are added prior and/or during malting of said cereals.

The preferred bacteria used are lactic acid producing bacteria, such as various *Lactobacilli*, e.g., *Lactobacillus casei*, *Lactobacillus casei* var. *rhamnosus*, *Lactobacillus fermentum*, *Lactobacillus plantarum* and *Lactobacillus brevis*, and bacteria of the genus *Pediococcus*, e.g., *Pediococcus acidilactici*.

Preferred moulds are moulds of the genus *Aspergillus* and *Geotrichum*, like *Geotrichum candidum*.

The international patent application WO94/16053 describes a process for treating cereals for inhibiting growth of unwanted microbial species by inoculating the cereals during the germination process with a lactic acid bacteria preparation or a preparation produced by lactic acid bacteria. The preferred bacteria are lactic acid bacteria belonging to genus *Lactococcus*, *Leuconostoc*, *Pediococcus* or *Lactobacillus*.

The British patent application GB-1211779 provides a method for the automatic control and regulation of a malting process. It enables one to determine the parameters necessary for a successful automatically controlled and regulated malting process.

In the proceedings of the European Brewery Convention, volume 16, 1977, pages 245 to 254, the influence of some fungi on malt quality is described, more specifically, contamination of barley malt with fungi which has led to gushing and other qualitative changes in the beer.

The German patent application DE-3028360 discloses a method to make malt out of corn.

However, malt prepared according to the present invention is of better quality than that prepared according to WO 94/29430. This is exemplified by higher β-glucanase and xylanase activities, lower-glucan contents in malt and wort and improved European Brewery Convention analytical data.

AIMS OF THE INVENTION

The present invention aims to provide an improved preparation process for malted cereals and improved malted cereals.

A main aim of the invention is to provide an improved preparation process for malted cereals and improved malted cereals in terms of brewing performances, especially malted cereals having an improved quality in terms of enzymatic potential and microbial safety.

Another aim is to provide a process and improved malted cereals which vary less in quality with the raw material used.

A further aim of the invention is to obtain malted cereals which improve the biotechnological production process of beverages and may improve the properties of the said obtained beverages.

SUMMARY OF THE INVENTION

The present invention is directed to a process for the preparation of a malted cereal, the malted cereal which is the product of the process of the invention, and a combination of wetted or moistened cereal and activated spores which, when held for a sufficient time and temperature, provide a malted cereal product of enhanced enzymatic activity. The product of the invention has enhanced enzymatic activity of at least one enzyme, such as β-glucanase, xylanase, amylase, naturally occurring enzymes, and/or protease activity, over malted cereal products which are similarly prepared with wetted cereal products with or without microorganisms.

The process of the invention utilizes activated spores from microorganisms such as bacteria or moulds. The process generally comprises combining water, the cereal and activated spores and holding the combination until a malted cereal of enhanced enzymatic activity is formed. Generally the combination is made by inoculating the moistened cereal with the activated spores, but the activated spores and cereal may be combined before or after the moistening of the cereal. In the process of the invention, the combination of wetted cereal and activated spores has a concentration of activated spores, holding time and holding temperature which are effective for providing the malted cereal with an increase in enzymatic activty of at least one enzyme, such as β-glucanase, xylanase, amylase, naturally occurring enzymes, and/or protease activity, which is greater than the enzymatic activity which is obtained by holding the wetted cereal without activated spores, or even with the bacteria or moulds from which the spores come.

In an important aspect, the cereal, activated spores are combined before or after the time of wetting the cereal and the combination is held at a temperature of at least about 5° C. and not more than about 30° C., preferably between about 10° to about 20° C. and the activated spores are at a concentration in the combination to obtain an increase in enzymatic activity of the malted cereal. In another important aspect, the wetted or moistened cereal and activated spore combination is held for a time and temperature until the cereal has a moisture content of at least about 20 weight percent. In yet another aspect, after the wetted cereal has attained an increased moisture content and has started to germinate, it is dried to a moisture content of not more than about 15 weight percent. In still another important aspect, the moistened cereal and activated spores are held together until the cereal has a moisture content of between about 20 to about 60 weight percent, preferably from about 38 to about 47 weight percent, and has germinated for about 2 to about 7 days, preferably about 3 to about 6 days, at a temperature of from about 10° to about 30° C., preferably from about 14° to about 18° C. In important aspect, the germinated cereal is dried at a temperature of from about 40° to about 150° C. preferably between about 45° and 85° C. until the dried malted cereal has a moisture content of from about 2 to about 15 weight percent moisture, preferably from about 4 to abut 7 weight percent moisture. Importantly, the process of the invention may increase β-glucanase activity of a malted cereal by a factor of at least about 4 as compared to a malted cereal prepared without activated spores according to the invention.

In another important aspect, the present invention provides a malted cereal having a higher quantity of acrospire lengths that were significantly longer in comparison to acrospire lengths when traditional malting methods were used.

In an important aspect, the cereals which may be used in the invention include barley, wheat and sorghum. In one aspect of the invention the spores of moulds are used. In another aspect, the spores of bacteria are used.

In another aspect, the cereals may be disinfected or may not be disinfected.

Preferably, for the preparation of malted barley, the spores from bacteria are from gram positive bacteria or gram negative bacteria, selected from the group of *Micrococcus* spp., *Streptococcus* spp., *Leuconostoc* spp., *Pediococcus* spp. preferentially *Pediococcus halophilus, Pediococcus cerevisiae, Pediococcus damnosus, Pediococccus hemophilus, Pediococccus parvulus, Pediococcus soyae, Lactococcus* spp., *Lactobacillus* spp. preferentially *Lactobacillus acidophilus, Lactobacillus amylovorus,* preferentially *Lactobacillus amylovorus* strain ATCC 33620, *Lactobacillus bavaricus, Lactobacillus bifermentans, Lactobacillus brevis* var *lindneri, Lactobacillus* casei var casei, *Lactobacillus delbrueckii, Lactobacillus delbrueckii* var lactis, *Lactobacillus delbrueckii* var *bulgaricus, Lactobacillus fermenti, Lactobacillus gasserii, Lactobacillus helveticus, Lactobacillus hilgardii, Lactobacillus renterii, Lactobacillus sake, Lactobacillus sativorius, Lactobacillus cremoris, Lactobacillus kefir, Lactobacillus pentoceticus, Lactobacillus cellobiosus, Lactobacillus bruxellensis, Lactobacillus buchnerii, Lactobacillus coryneformis, Lactobacillus confusus, Lactobacillus florentinus, Lactobacillus viridescens, Corynebacterium* spp., *Propionibacterium* spp., *Bifidobacterium* spp., *Streptomyces* spp., *Bacillus* spp., preferentially *Bacillus subtilis* stain ATCC 6051, preferentially *Bacillus circulans, Sporolactobacillus* spp., *Acetobacter* spp., *Agrobacterium* spp., *Alcaligenes* spp., *Pseudomonas* spp., preferentially *Pseudomonas amylophilia, Pseudomonas aeruginosa, Pseudomonas cocovenenans, Pseudomonas mexicana, Pseudomonas pseudomallei, Gluconobacter* spp., *Enterobacter* spp., *Erwinia* spp., *Klebsiella* spp., and *Proteus* spp.

Preferably, for the preparation of malted barley spores are from fungi which are selected from the group (genera as described by Ainsworth and Bisby's dictionary of the fungi, 8th edition, 1995, edited by D L Hawkworth, P M Kirk, B C Sutton, and D N Pegler (632 pp) Cab International) of *Ascomycota* preferentially *Dothideales,*preferentially *Mycosphaerellaceae* preferentially *Mycosphaerella* spp., *Venturiaceae* preferentially *Venturia* spp. *Eurotiales* preferentially *Monascaceae* preferentially *Monascus* spp., *Trichocmaceae* preferentially *Emericilla* spp., *Euroteum* spp., *Eupenicillium* spp., *Neosartorya* spp., *Talaromyces* spp., *Hypocreales* preferentially *Hypocreceae* preferentially *Hypocrea* spp., *Saccharomycetales* preferentially *Dipodascaceae, Dipodascus* spp., *Galactomyces* spp., *Endomycetaceae* preferentially *Endomyces* spp., *Metschnkowiaceae* preferentially *Guilliermondella* spp., *Saccharomycetaceae* preferentially *Debaryomyces* spp., *Dekkera* spp., *Pichia* spp., preferentially *Pichia anomala,* preferentially *Pichia anomala* strain ATCC 8168. *Kluyveromyces* spp., *Saccharomyces* spp., *Torulaspora* spp., *Zygosaccharomyces* spp., *Saccharomycodaceae* preferentially *Hanseniaspora* spp.; *Schizosaccharomycetales* preferentially *Schizosaccharomycetaceae* preferentially *Schizosaccharomyces* spp., *Sord-*

*ariales* preferentially *Chaetomiaceae, Chaetomium* spp., preferentially *Chaetomium virescens* strain ATCC 32319, *Sordariacea* preferentially *Neurospora* spp., *Zygomycota* preferentially *Mucorales* preferentially *Mucoraceae* preferentially *Absidia* spp., *Amylomyces* spp., *Rhizomucor* spp. *Actinomucor* spp., *Thermomucor* spp., *Chlamydomucor* spp., *Mucor* spp. preferentially *Mucor circinelloides, Mucor grisecyanus, Mucor hiemalis, Mucor indicus, Mucor mucedo, Mucor piriformis, Mucor plumbeus, Mucor praini, Mucor pusillus, Mucor silvaticus, Mucor javanicus, Mucor racemosus, Mucor rouxianus, Muoor rouxil, Mucor aromaticus, Mucor flavus, Mucor miehei, Rhizopus* spp. preferentially *Rhizopus arrhizus, Rhizopus oligosporus, Rhizopus oryzae* preferentially *Rhizopus oryzae* strain ATCC 4858, *Rhizopus oryzae* strain ATCC 9363, *Rhizopus oryzae* strain NRRL 1891, *Rhizopus oryze* strain NRRL 1472, *Rhizopus stolonifer, Rhizopus thailandensis*, preferentially *Rhizopus thailandensis* strain ATCC 20344, *Rhizopus formosaensis*, preferentially *Rhizopus formosaensis* strain ATCC 26612, *Rhizopus chinensis, Rhizopus cohnii, Rhimpus japonicus, Rhizopus nodosus, Rhizopus delemar, Rhizopus acetorinus, Rhizopus chlamydosporus, Rhizopus circinans, Rhizopus javanicus, Rhizopus peka, Rhizopus salto, Rhizopus tritici, Rhizopus niveus, Rhizopus microsporus, Mitosporic fungi* preferentially *Aureobasidium* spp., *Acremonium* spp., *Cercospom* spp., *Epicoccum* spp., *Monilia* spp. preferentially *Monilia candida, Monilia sitophila, Mycoderma* spp., *Candida* spp., preferentially *Candida diddensiae, Candida edax, Candide etchellsii, Candida kefir, Candida krisei, Candida lactose, Candida lambica, Candida melinii, Candida utilis, Candida milleri, Candida mycoderma, Candida parapsilosis, Candida obtux, Candida tropicalis, Candida valida, Candida versatilis, Candida guilliermondii, Rhodotorula* spp., *Torulopsis* spp., *Geotrichum* spp. preferentially *Geotrichum amycelium, Geotrichum armillariae, Geotrichum asteroides, Geotrichum bipunctatum, Geotrichum dulcitum, Geotrichum eriense, Geotrichum fici, Geotrichum flavo-brunneum, Geotrichum fragrans, Geotrichum gracile, Geotrichum heritum, Geotrichum kiebaknii, Geotrichum penicillatum, Geotrichum hirtum, Geotrichum pseudocandidum, Geotrichum rectangulatum, Geotrichum suaveolens, Geotrichum vanryiae, Geotrichum loubieri, Geotrichum microsporum, Cladosporium* spp., *Trichoderma* spp. preferentially *Trichoderma hamatum, Trichoderma harzianum, Trichoderma koningii, Trichoderma pseudokoningli, Trichoderma reesei*, preferentially *Trichoderma reesei* strain ATCC 5875, *Trichoderma virgatum, Trichoderma viride, Oldium* spp., *Alternaria* spp. preferentially *Alternaria alternata, Alternaria tenuis, Helminthosporium* spp. preferentially *Helminthosporium gramineum, Helminthosporium sativum, Helminthosporium teres, Aspergillus* spp. preferentially *Aspergillus ochraseus* Group, *Aspergillus nidulans* Group, *Aspergillus versicolor* Group, *Aspergillus wentii* Group, *Aspergillus candidus* Group, *Aspergillus flavus* Group, *Aspergillus niger* Group, *Aspergillus oryzae* strain ATCC 14156, *Penicillum* spp. preferentially *Penicillum aculeatum, Penicillum citrinum, Penicillum claviforme, Penicillum funiculosum, Penicillum italicum, Penicillum lanoso-viride, Penicillum emersonil, Peniclilum lilacinum, Penicillum expansum*, and mixtures thereof.

Preferably, for the preparation of malted cereals other then malted barley, especially for the preparation of malted wheat, rye, corn, oats, rice, millet, triticale, and sorghum, said bacteria are gram positive or gram negative bacteria selected from the group of *Micrococcus* spp., *Streptococcus* spp., *Leuconostoc* spp., *Pediococcus* spp., *Lactococcus* spp., *Lactobacillus* spp., *Corynebacterium* spp., *Propionibacterium* spp., *Bifidobacterium* spp., *Streptomyces* spp., *Bacillus* spp., *Sporolactobacillus* spp., *Acetobacter* spp., *Agrobacterium* spp., *Alcaligenes* spp., *Pseudomonas* spp., *Gluconobacter* spp., *Enterobacter* spp., *Erwinia* spp., *Klebsiella* spp., *Proteus* spp. or a mixture thereof; and said fungi are fungi selected from the group of: *Ascomycota* preferentially *Dothideales* preferentially *Mycophaerellaceae* preferentially *Mycosphaerella* spp., *Venturiaceae* preferentially *Venturia* spp.; *Eurotiales* is preferentially *Monascaceae* preferentially *Monascus* spp., *Trichocomaceae* preferentially *Emericilla* spp., *Euroteum* spp., *Eupenicillium* spp., *Neosartorya* spp., *Talaromyces* spp., *Hypocreales* preferentially *Hypocreaceae* preferentially *Hypocrea* spp., *Saccharomycetales* preferentially *Dipodascaceae* preferentially *Dipodascus* spp., *Galactomyces* spp., *Endomycetaceae* preferentially *Endomyces* spp., *Metschnikowiaceae* preferentially *Guilliermondella* spp., *Saccharomycetaceae* preferentially *Debaryomyces* spp., *Dekkera* spp., *Pichia* spp., *Kluyveromyces* spp., *Saccharomyces* spp., *Torulaspora* spp., *Zygosaccharomyces* spp., *Saccaromycodaceae* preferentially *Hanseniaspora* spp., *Schizosaccheromycetales* preferentially *Schizosaccharomycetaceae* preferentially *Schizosaccharomyces* spp.; *Sordariales* preferentially *Chaetomiaceae* preferentially *Chaetomium* spp., *Sordariaceae* preferentially *Neurospora* spp., *Zygomycota* preferentially *Mucoraies* preferentially *Mucoraceae* preferentially *Absidia* spp., *Amylomyces* spp., *Rhizomucor* spp., *Actinomucor* spp., *Thermomucor* spp., *Clamydomucor* spp., *Mucor* spp., *Rhizopus* spp.; preferentially *Rhizopus oryza* strain ATCC 9363, *Mitosporic fungi* preferentially *Aureobasidium* spp., *Acremonium* spp., *Cerocospora* spp., *Epicoccum* spp., *Monilia* spp., *Mycoderma* spp., *Candida* spp., *Rhodotorula* spp., *Torulopsis* spp., *Geotrichum* spp., *Cladosporium* spp., *Trichoderma* spp., *Oldium* spp., *Alternaria* spp., *Helminthosporium* spp., *Aspergillus* spp., *Penicillium* spp.

DEFINITIONS

As used herein the term "spore" refers to a dormant and highly resistant reproductive cell formed by bacteria and fungi in response to environment conditions that do not favor the growth of the organism. When exposed to favorable environmental conditions, spores are capable of developing into a viable adult organism without fusion with another cell.

As used herein the term "activated spore" means a spore having one of the following properties:

i) The spore is swollen such that its size is increased by a factor of between about 1.2 and about 10 over its dormant size; and/or ii) one or more germ tubes per spore is formed.

Activated spores are prepared by one or a combination of the following treatments.

i) cycles of wetting and/or drying;

ii) addition of appropriate nutritional supplies (such as a nitrogen source, preferably amino acids and/or a carbon source, preferably mono- or disaccharides) or spore elements;

iii) exposure to temperature changes, preferably within a temperature range of about 0 to about 80° C.;

iv) exposure to changes in pH, preferably within a pH range of about 2.0 to about 8.0, more preferably about 3.0 to about 6.0.

The term "germination" as used herein means the beginning or resumption of growth by a seed. In accordance with the process of the present invention, germination begins to occur during and/or after the cereal has been steeped. Germination of cereals is generally understood to mean hydration of the seed, swelling of the cereal and inducing growth of the embryo. Environmental factors affecting germination include moisture, temperature and oxygen level. A rapid increase in cells of the root stem leads to root development, while corresponding growth sends forth a shoot.

As used herein, the term "steeping" refers to wetting of the cereal. Wetting may include one or more stages over a time and temperature effective for providing a moisture content of between about 20% and about 60% by weight.

The term "specific activity" as used herein refers to the concentration and activity of an enzyme in a preparation. The specific activity of a preparation is reported as units/mg protein. One unit of enzyme is that amount that catalyzes the formation of 1 mmole of product per minute under defined conditions. The amount of enzyme present in a preparation is measured using standard protein assay techniques and catalytic activity is determined by following the formation of product or removal of substrate over time.

DESCRIPTION OF THE PREFERRED EMBODIMENTS

According to a preferred embodiment, the preparation process of malted cereals according to the invention comprises the following steps: a steeping step includes one or more wetting stages or the total time of submersion in water during steeping for physiological reasons does not exceed 30 hours (preferably 10 to 25 hours) or the kilning step includes more then two temperature steps and the microbial cultures which are added, are preferably selected from the group consisting of Rhizopus spp., preferably *Rhizopus oryzae*, such as *Rhizopus oryze* strain ATCC9363 and/or Pseudomonas spp., preferably *Pseudomonas herbicola*.

According to the invention, the malted cereals are selected from the group of barley, wheat, rye, corn, oats, rice, millet, triticale, sorghum and the like.

In the process according to the invention, the same or different activated spores are added in one or more time(s). The use of activated spores greatly enhances their contribution to improved malt quality, most likely because of more vigorous growth. The activated spores have one of the following properties: the treated spores are significantly more swollen than their dormant, size, more particularly, the size of the spores is increased by a factor preferably between 1.2 and 10 over their dormant size and/or one or more germ tubes per spore are formed. The activated spores are prepared by subjecting them to environmental changes, preferably by one or a combination of the following treatments;
 (a) cycles of wetting and/or drying;
 (b) addition of appropriate nutritional supplies (such as a nitrogen source, preferably amino acids and/or a carbon source, preferably mono- or disaccharides) or spore elements;
 (c) exposure to temperature changes, preferably within a temperature range of 0° to 80° C.;
 (d) exposure to changes in pH, preferably within a pH range of 2.0 to 8.0, more preferably between 3.0 and 6.0.

The activated spores may be introduced before or during the malting process. For example, the activated spores may be introduced during the various malting or steeping stages before or after immersion of the cereal.

The concentration of the spores may vary depending on the conditions of the malting process and the type of active spore being utilized. Generally about $1 \times 10^2$ to about $1 \times 10^7$, preferably about $1 \times 10^3$ to about $1 \times 10^5$ activated spores per gram air dry cereal is utilized.

The present invention also concerns the malted cereals obtained according to the process of the invention, which present improved European Brewery Convention analysis results. Said improvements may have to do with modification and/or increased hydrolytic enzyme activities. At the same time, a decreased level of toxins, an increased microbial safety by e.g., outcompeting undesirable microbial flora such as Fusarium and/or an increased acceptability compared to the malted cereals according to the state of the art, may be observed.

For instance, the malted cereals according to the invention may have a lower β-glucan content or a higher enzyme activity such as, for example, β-glucanase or xylanase activity (as represented in the following examples and figures) than the malted cereals according to the state of the art. This allows for a better processability of the malt in wort and beer production as exemplified by increased rates of filtration.

The activated spores and cereal may be combined and wetted by submersion in water to steep the combination which should not exceed 30 hours. The activated spores can also be sprayed on the barley during the steep period or during the germination process. The pH during this period should be from about 1.5 to about 14, preferably about 4 to about 6. β-glucanase activity of malted barley made according to the invention is higher than 700 units/kg and xylanase activity is higher than 250 units/kg.

An object of the present invention concerns the use of the malted cereals according to the invention for the preparation of beverages.

The invention is also related to these improved beverages.

The improved malted cereals according to the invention could also be used in other biotechnological processes well known by the Person Skilled in the Art, in which in most cases advantage is taken of their improved quality.

The present invention will be further described in various examples in view of the following drawings.

EXAMPLE 1

1. Preparation of Microbial Cultures

Figure 1:
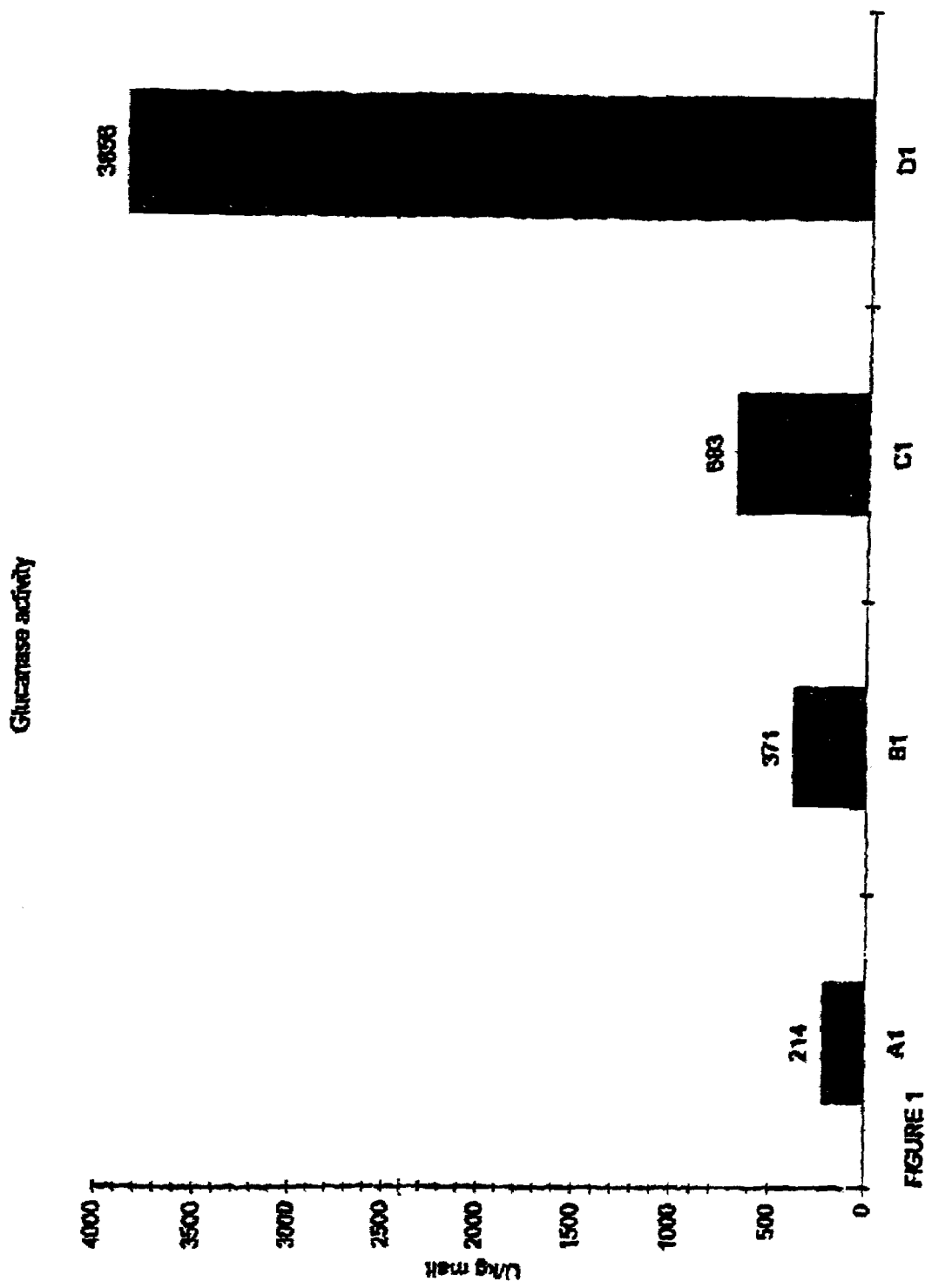
FIG. 1 represents the β-glucanase activity of malted barley obtained according to the preparation process of example 1. (legend: see example 1).

Strain
 S46: *Rhizopus oryzae* ATCC 9383.

Preparation of the Spore Suspension
 the strain was grown on PDA (Potato Dextrose Agar, Oxoid) for approximately 10 days at 28° C.;
 the spores were harvested by flooding the cultures with sterile physiological saline (0.9% NaCl) and by rubbing the sporulated mycelium gently with a sterile spatula;

the spore suspension was washed twice with sterile physiological saline (0.9% NaCl) by centrifugation (5500 rpm, Sorvall type SS-34®, for 15 min.) and resuspended in sterile physiological saline (0.9% NaCl);

the spore density was determined microscopically using a Thoma counting chamber.

Activation of the Spore Suspension $10^7$ spores were transferred into 20 ml of sterile, acidifed TSB (Tryptic Soy Broth, Oxoid), pH=4.0 and incubated in a shaking water bath during 5 to 6 hours at ±42° C.;

The activated spores were harvested by centrifugation (3500 rpm, Sorvall type SS-34®, for 15 min.), washed once with sterile physiological saline (0.9% NaCl) by centrifugation (3500 rpm, Sorvall type SS-34®, for 15 min.) and resuspended in sterile physiological saline (0.9% NaCl).

2. Barley

Plaisant-1994 French harvest.

3. Process.

Setup

Malts were made by four different malting processes:

A1. traditional malting
(without inoculation of any spore suspension)

B1. malting process using non-activated spores
(inoculation of the steeped barley with a suspension of non-activated spores of *Rhizopus oryzae* ATCC 9363)

C1. malting process according to the invention
(inoculation of the steeped barley with a suspension of activated spores of *Rhizopus oryzae* ATCC 9363)

D1. malting process according to the invention
(inoculation of the steeped barley during the first wet stage with a suspension of activated spores of *Rhizopus oryzme* ATCC 9363)

Steeping the steeping was carried out on a 2 kg base with a total water (tap water) to air dry barley ratio of 1.5:1;

use was made of 2 fermentors (Bioflo III, New Brunswick Scientific), in which perforated plates were placed;

temperature was only controlled during the wet stages, during the air rest stages, the system was allowed to reach room temperature (±20° C.);

during the whole steeping period, the barley was aerated (4 liter sterile air per minute);

steeping was carried out by immersion using the following scheme;

|  | Temperature (° C.) | Duration (h) |
|---|---|---|
| First wet stage | 13 | 6:00 |
| First air rest stage | 20 | 17:00 |
| Second wet stage | 14 | 5:00 |
| Second air rest stage | 20 | 15:30 |
| Third wet stage | 16 | 2:30 |

Addition of the Microbial Cultures

±480 g of steeped barley was immersed in 0.5 liter of tap water which contained no spores (A1), non-activated spores of *Rhizopus oryzae* ATCC 9363 (B1) or activated spores of *Rhizopus oryzae* ATCC 9363 (C1, according to the invention); for B1 and C1, the steeped barley was inoculated with $10^4$ spores per gram of air dry barley;

during the steeping, $10^4$ activated spores per gram air dry barley were inoculated to the water of the first wet stage (D1);

the fluid was removed by draining.

Germination germination was carried out in a cylindrical container with perforated lids at a temperature of 16°-18° C. during 4 days;

air was supplied by natural diffusion;

the containers were slowly rotated on an electrically controlled roller system (Cellroll®, Tecnorama); i.e., every two hours the containers were rolled for 15 min. at 1 rpm.

Kilning the kilning was carried out in a Joe White malting unit (Australia),

|  | Air flow (%) | Recirc. Air (%) | Temp. (° C.) | Durat. (h) |
|---|---|---|---|---|
| First kilning stage | 25 | 0 | 62 | 3:00 |
| Second kilning stage | 25 | 0 | 65 | 2:00 |
| Third kilning stage | 25 | 0 | 68 | 2.00 |
| Fourth kilning stage | 25 | 25 | 73 | 2:00 |
| Fifth kilning stage | 25 | 50 | 78 | 1:00 |
| Sixth kilning stage | 25 | 75 | 80 | 2:00 |
| Seventh kilning stage | 25 | 100 | 83 | 6:00 |
| Shut down air off |  |  |  | Time out |

4. Methods of Analysis and Results

Methods for determination and units of moisture, extract, extract difference, color, total protein content, soluble protein content, Kolbach index, pH, diastatic power, according to Analytica-European Brewery Convention (Fourth Edition, 1987, Brauerei und Getränke-Rundschau).

Metods for determination and units of turbidity, friability, homogeneity, whole grains, b-glucan content, according to Analytica-European Brewery Convention (Fourth Edition, 1987, Brauerei und Getränke-Rundschau, supplement published in 1989).

Postcoloration of the wort is determined after boiling the congress wort under reflux at 108° C. during 2 hours.

The viscosity of the congress wort is determined with the Delta-viscosimater.

For the determination of the filtration volume, the congress wort is filtered over a Schleicher and Schuell 597½ folded filter. The volume (in mil) that is obtained after 1 hour of filtration is the filtration volume of the wort.

Modification is determined with the Calcofluor apparatus (Haffmans) according to the Carisberg method (Analytica-Europeon Brewery Convention (Fourth Edition, 1987, Brauerei und Getränke-Rundschau).

The β-glucanase and xylanase activities are determined with the β-glucazym method (Megazme (Austr.) Pty Ltd. (April, 1993) and the xylazym method ((Megazyme (Austr.) Pty Ltd. (September 1995)), respectively.

|  | Traditional Malting Process (A1) | Malting Process using non-activated spores (B1) | Malting Process according to the Invention (C1) | Malting Process according to the Invention (D1) |
|---|---|---|---|---|
| Moisture | 3.9 | 4.1 | 3.8 | 4.3 |
| Extract | 80.3 | 80.4 | 80.3 | 79.8 |
| Extract Difference | 0.8 | 0.8 | 0.4 | 1.1 |
| Color | 3.3 | 3.3 | 4.1 | 4.1 |
| Wort Turbidity | 1.3 | 1.2 | 0.7 | 0.8 |
| Postcoloration | 6 | 6 | 7.3 | 7.5 |
| Total Protein Content | 10.1 | 10.3 | 10 | 10.1 |
| Soluble Protein Content | 4.1 | 4.4 | 4.8 | 5.2 |
| Kolbach Index | 40.6 | 42.7 | 48 | 51.0 |
| Viscosity | 1.57 | 1.52 | 1.52 | 1.54 |
| pH | 6.05 | 6.3 | 5.87 | 5.79 |
| Diastatic Power | 345 | 349 | 352 | 419 |
| Whole Grains | 0.3 | 0.3 | 0.1 | ND |
| Friability | 83 | 82 | 83.9 | ND |
| Homogeneity | 98.5 | 97.9 | 98.6 | ND |
| β-glucan content | 122 | 108 | 46 | <40 |
| Filtration Volume | 210 | 265 | 290 | 275 |
| Modification | 88.2 | 90.5 | 93.4 | ND |
| β-glucanase Activity | 214 | 371 | 683 | 3656 |
| Xylanase Activity | 28 | 34 | 56 | 984 |

Figure 2:
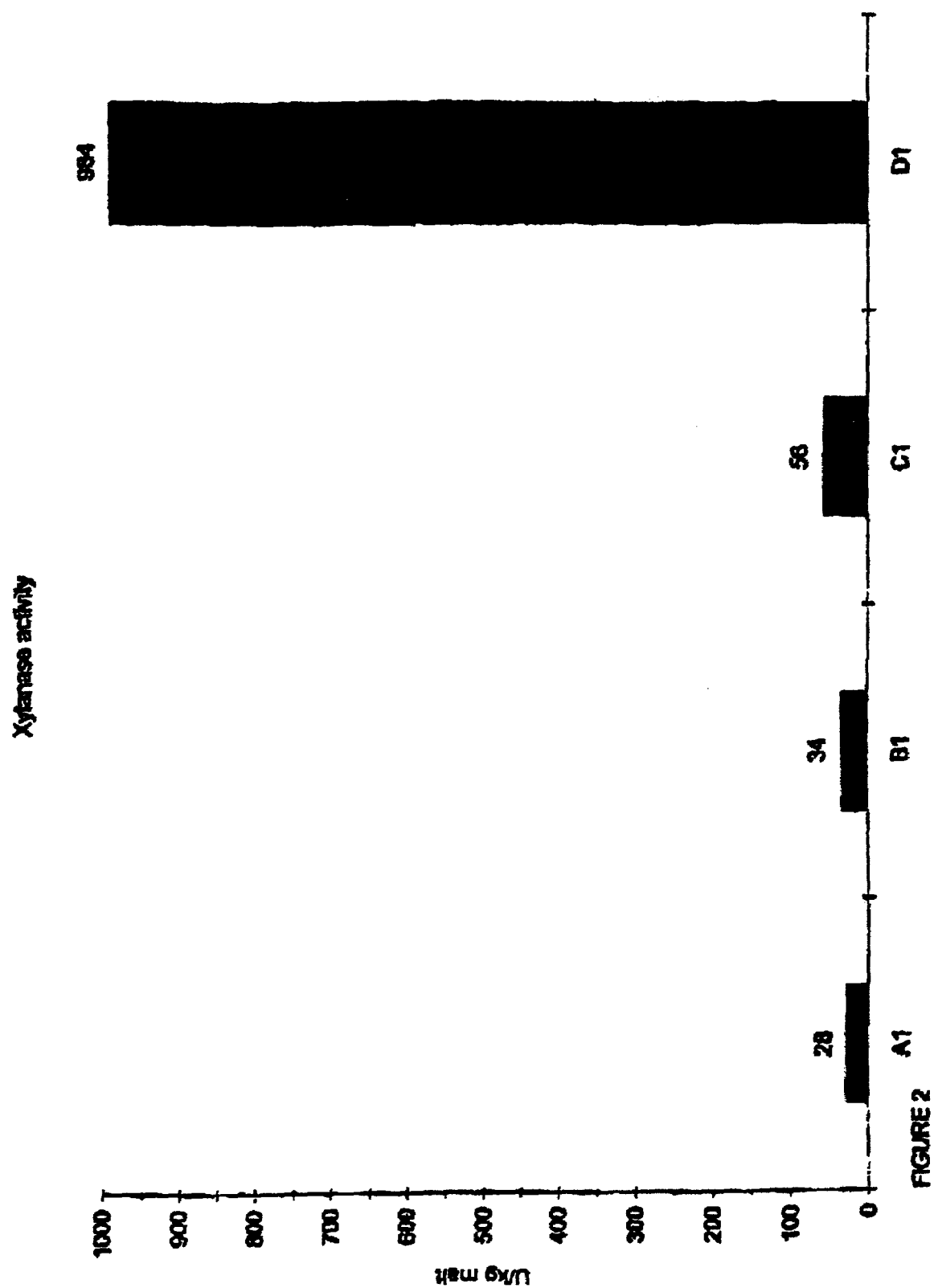
FIG. 2 represents the xylanese activity of malted barley obtained according to the preparation process of example 1. (legend: see example 1).

FIGS. 1 and 2 represent the β-glucanase and xylanase activity, respectively of the obtained malted barley (A1, B1, C1, D1). These malted barleys are obtained according to a traditional malting process (A1) or using non-activated spores during the malting process (B1) or according to the above-described malting process of the invention (C1, D1). The β-glucanase activity was determined with the β-glucazym method (Megazyme (Austr.) Pty Ltd. (April, 1993)). Therefore, malt β-glucanase activity (U/kg) was calculated at 380×E (590 nm)+20. The xylanase activity was determined with the endo 1-4-xylazym method (Megazyme (Austr.) Pty Ltd. (September 1995)). Therefore, malt xylanese activity (U/kg) was calculated as (46.8×E (590 nm)+0.9)×5).

EXAMPLE 2

1. Preparation of Microbial Cultures

Strain
  S46: *Rhizopus oryzae* ATCC 9363.

Preparation of the Spore Suspension
  as described in Example 1.

Activation of the Spore Suspension
  as described in Example 1.

2. Barley
  Stander-1995 North American harvest.

3. Process

Setup
  Malts were made by six different malting processes:
  A2, traditional malting process
    (without inoculation of any spore suspension)
  B2, malting process using non-activated spores
    (inoculation of the steeped barley with a suspension of non-activated spores of *Rhizopus oryzae* ATCC 9363)
  C2, malting process according to the invention
    (inoculation of the steeped barley during the first wet stage with a suspension of activated spores of *Rhizopus oryzae* ATCC 9383)
  D2, malting process according to the invention
    (inoculation of the steeped barley during the second wet stage with a suspension of activated spores of *Rhizopus oryzae* ATCC 9363)
  E2, malting process according to the invention
    (inoculation of the steeped barley during the third wet stage with a suspension of activated spores of *Rhizopus oryzae* ATCC 9363)
  F2. malting process according to the invention
    (inoculation of the steeped barley with a suspension of activated spores of *Rhizopus oryzae* ATCC 9363)

Steeping and Addition of the Microbial Cultures
  the steeping was carried out on a 300 g base with a total water (tap water) to air dry barley ratio of 5:3;
  use was made of 2000 ml flasks;
  a temperature of 18° C. was maintained during the wet stages and during the air rest stages;
  during the whole steeping period, the barley was aerated by means of compressed air;
  steeping was carried out by immersion using the following schedule;

|  | Duration (h) |
|---|---|
| First wet stage | 6:00 |
| First air rest stage | 18:00 |
| Second wet stage | 5:00 |
| Second air rest stage | 19:00 |
| Third wet stage | 2:00 | during the steeping, $10^4$ activated spores per gram of air dry barley were inoculated to the water of the first wet stage (C2), of the second wet stage (D2) or of the third wet stage (E2) before immersion of the barley;
  the steeped barley was immersed in 0.5 liters of tap water which contained no spores (A2), non-activated (B2) or activated (C2, D2, E2, F2) spores;
  for B2, and F2, the steeped barley was inoculated with $10^4$ spores per gram of air dry barley,
  the fluid was removed by draining.

Germination
  as described in Example 1.

Kilning
  as described in Example 1.

Malt evaluation

Figure 5:
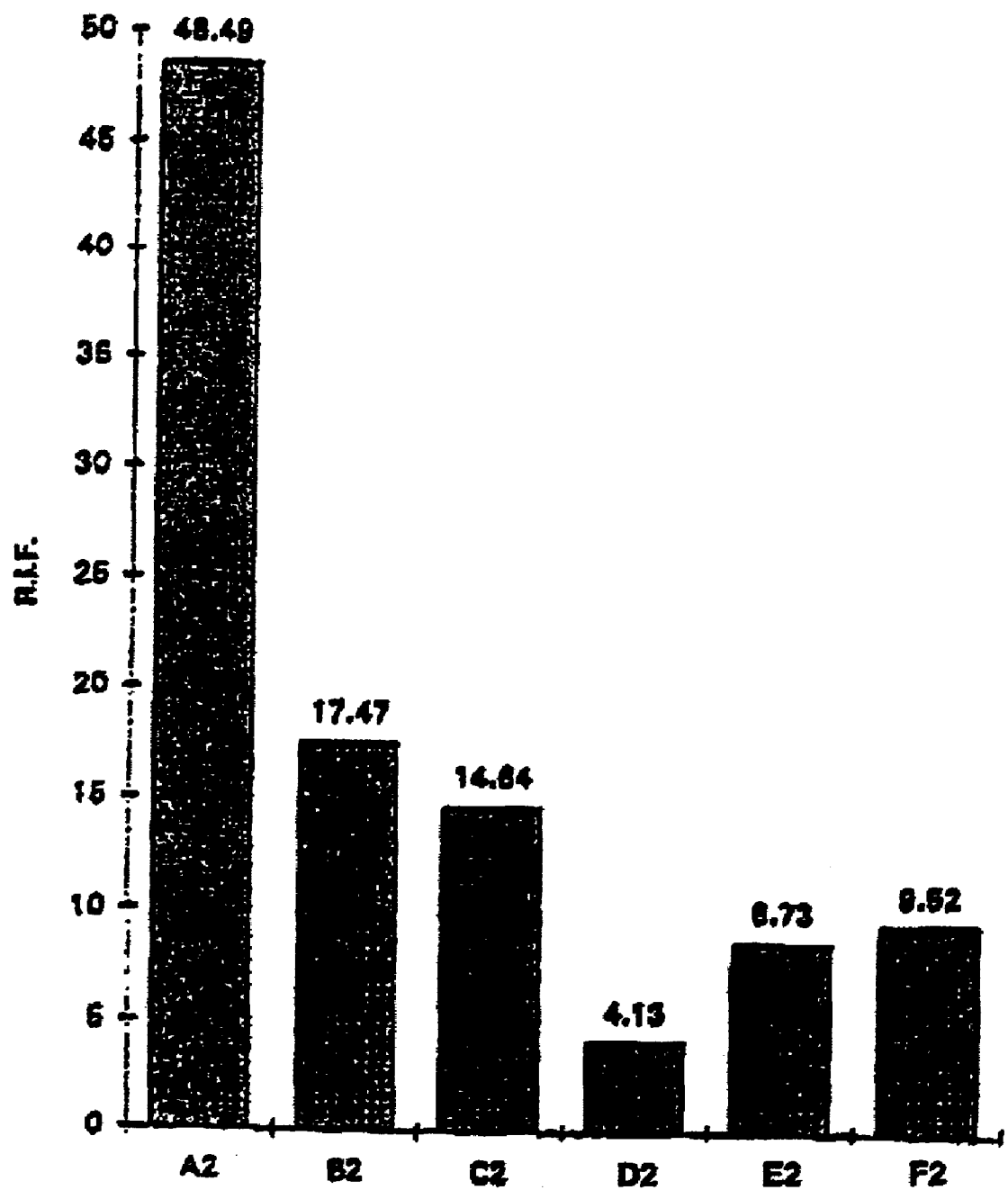
FIG. 5 represents the relative increase factory (R.I.F.) for bacterial populations (see text, malt evaluation, example 2) (legend: see example 2).

Determination of the Increase of the Bacterial Population
  To judge the evolution of the bacterial population during the malting process, a relative increase factor (R.I.F.) was determined by dividing the total bacterial count occurring on the green malt by the total bacterial count occurring on the barley. The total bacterial count was determined after plating appropriate dilutions of an extract of the kernels on Tryptic Soy Agar (Oxoid) supplemented with 100 ppm pimaricine and after incubation at 28° C. for 3 days.
  FIG. 5 shows the increase of the bacterial population during the malting according to the preparation process of Example 2.

EXAMPLE 3

1. Preparation of Microbial Cultures

Strain
  S 46: *Rhizopus oryzae* ATCC 9363

Preparation of the Spore Suspension
  as described in Example 1

Activation of the Spore Suspension
  as described in Example 1

2. Barley
Plaisant-1994 French harvest;

3. Process

Setup
  Malts were made by three different malting processs:
  A3. traditional malting
    (without inoculation of any spore suspension)
  B3. malting process using non-activated spores
    (inoculation of the steeped barley with a suspension of non-activated spores of *Rhizopus oryzae* ATCC 9363)
  C3. malting process according to the invention
    (inoculation of the steeped barley with a suspension of activted spores of Rhizopus oryzsa ATCC 9363)

Steeping
  the steeping was carried out on a 2 kg base air dry barley with a total water (tap water) to air dry barley ratio of 1.5:1;
  the pH of the steeping water was controlled at pH=5.5 by addition of lactic acid and NaOH;
  a fermentor (Bioflo III, New Brunswick Scientific), in which a perforated plate was placed, was used for steeping;
  temperature was only controlled during the wet stages; during the air rest stages the system was allowed to reach room temperature (ca. 20° C.);
  during the whole steeping period the barley was aerated (4 liters startle air per minute);
  steeping was carried out by immersion using the following schedule:

| | Temperature (° C.) | Duration (h) |
| --- | --- | --- |
| First wet stage | 13 | 6:00 |
| First air rest stage | 20 | 17:00 |
| Second wet stage | 14 | 5:00 |
| Second air rest stage | 20 | 15:30 |
| Third wet stage | 16 | 2:30 |

Addition of the Microbial Cultures
  460 g of steeped barley was immersed in 0.5 liters of tap water which contained no spores (A3), non-activated spores of *Rhizopus oryzae* ATCC 9363 (B3) or activated spores of *Rhizopus oryzae* ATCC 9363 (C3 according to the invention); for B3 and C3, the steeped barley was inoculated with $10^4$ spores per gram of air dry barley;
  the fluid was removed by draining.

Germination
  as described in Example 1

Kilning
  as described in Example 1

4. Methods of analysis and results

These were as described in Example 1 (4. Methods of Analysis and Results).

See table on next page. In this table:
  A1/3: Traditional malting process
  B1/3: Malting process using non-activated spores
  C1/3: Malting process according to the invention

| | Example 3 pH control of the steeping water (pH-5.5) | | | Example 1 No pH control of the steeping water | | |
| --- | --- | --- | --- | --- | --- | --- |
| | A3 | B3 | C3 | A1 | B1 | C1 |
| Moisture | 3.8 | 3.6 | 3.7 | 3.9 | 4.1 | 3.8 |
| Extract | 78.9 | 80.2 | 80.7 | 80.3 | 80.4 | 80.3 |
| Extract Difference | 0.6 | 0.7 | 0.4 | 0.8 | 0.8 | 0.4 |
| Color | 3.2 | 4.2 | 4.4 | 3.3 | 3.3 | 4.1 |
| Wort Turbidity | 1 | 1 | 0.8 | 1.3 | 1.2 | 0.7 |
| Postcoloration | 5.1 | 7 | 7.2 | 6 | 6 | 7.3 |
| Total Protein Content | 10.2 | 10.1 | 10 | 10.1 | 10.3 | 10 |
| Soluble Protein Content | 4 | 4.4 | 4.8 | 4.1 | 4.4 | 4.8 |
| Kolbach Index | 39.2 | 43.6 | 48 | 40.6 | 42.7 | 48 |
| Viscosity | 1.52 | 1.53 | 1.52 | 1.57 | 1.52 | 1.52 |
| pH | 6.02 | 5.97 | 5.91 | 6.05 | 6.03 | 5.87 |
| Diastatic Power | 348 | 333 | 355 | 345 | 349 | 352 |
| Whole Grains | 0.2 | 0.2 | 0.1 | 0.3 | 0.3 | 0.1 |
| Friability | 81 | 81 | 85 | 83 | 82 | 83.9 |
| Homogeneity | 97.6 | 97.8 | 98.9 | 98.5 | 97.9 | 98.6 |
| β-glucan content | 190 | 57 | 40 | 122 | 108 | 46 |
| Filtration Volume | 210 | 215 | 200 | 210 | 265 | 290 |
| Modification | 84.1 | 85.5 | 87.4 | 88.2 | 90.5 | 93.4 |
| β-glucanase Activity | 202 | 931 | 1322 | 214 | 371 | 683 |
| Xylanase Activity | 43 | 65 | 71 | 28 | 34 | 56 |

Figure 3:
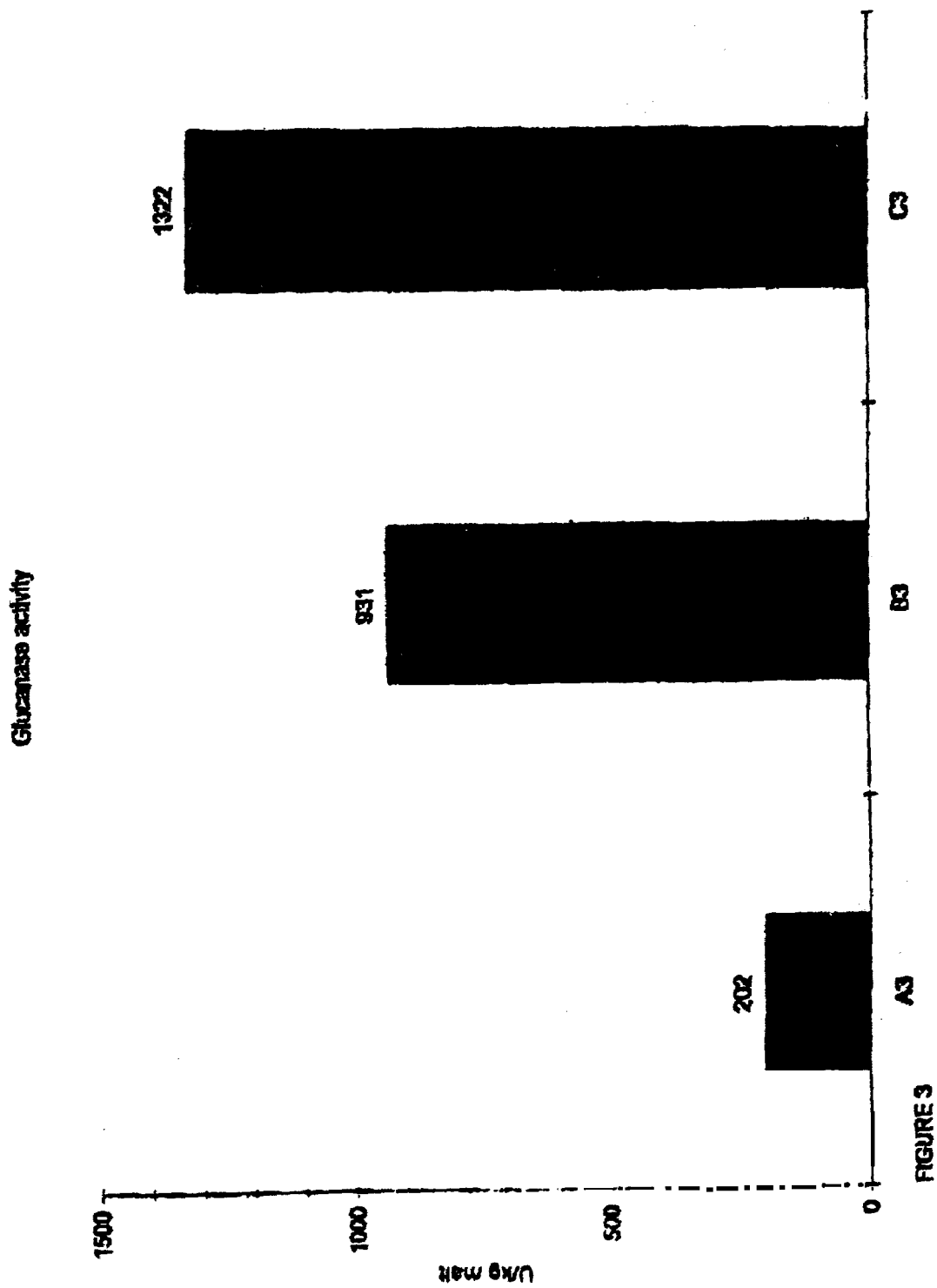
FIG. 3 represents the β-glucanase activity of malted barley obtained according to the preparation process of example 3. (legend: see example 3).

FIG. 3 represents the β-glucanase activity, measured according to β-Glucazym method [Megazyme (AUSTR) Pty. Ltd.] of the malted cereals A3, B3 and C3. Malt β-glucanase activity (U/kg) was calculated as described in example 1. A3 was obtained by the traditional malting process with pH control of the steeping water (pH=5.5). B3 resulted from the malting process according to the invention with the inoculation of steeped barley with a suspension of non-activated spores of *Rhizopus oryzae* ATCC 9363 and with pH control of the steeping water (pH=5.6). C3 was obtained by the malting process according to the invention with the inoculation of the steeped barley with a suspension of activated spores of *Rhizopus oryzae* ATCC 9363 and with pH control of the steeping water (pH=5.5).

These results show the increased β-glucanase activity when the pH of the steeping water is maintained at around 5.5.

Figure 4:
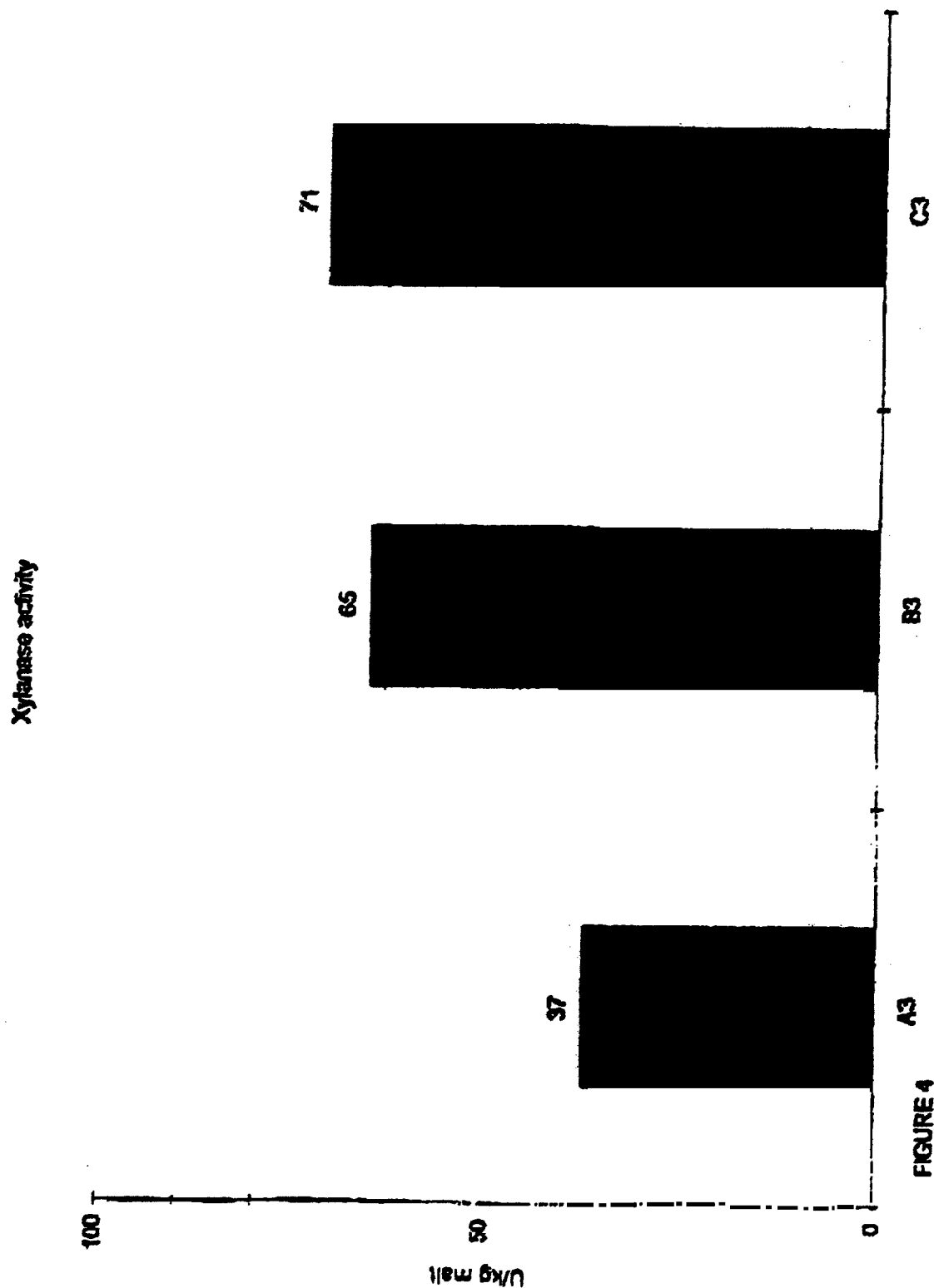
FIG. 4 represents the xylanase activity of malted barley obtained according to the preparation process of example 3. (legend: see example 3).

FIG. 4 gives the corresponding results for xylanase activity. These were measured according to xylazym method, Megazyme ((AUSTR) Pty. Ltd. (September 1995)). Malt xylanase activity was calculated as described in Example 1.

Comparison of the β-glucanase activity obtained according to examples 1 and 3 with the β-glucanase activity according to the state of the art as described in WO94/29430.

In order to compare the improved results regarding β-glucanase activity by the present invention, we defined the factor m as follows:

$$m = \frac{\beta\text{-glucanase activity of the treated malt}}{\beta\text{-glucanase activity of the controlled malt}}$$

This factor was calculated for control malt and malted treated with *Rhizopus oryzae* ATCC 9363 as described in Examples 1 and 3 of the present invention.

It was also calculated for the data described in WO94/29430 (Example 1) where *Geotrichum candidum* was used.

Both as described in WO94/29430, and in the present application, β-glucanase activity was determined with the beta-glucazyme method [Megazyme (AUSTR) Pty. Ltd. (April 1993)]. Therefore, malt β-glucanase activity (U/kg) was calculated as 380×E(590 nm)+20 and one unit of activity was defined as the amount of enzyme required to release one micromole of reducing sugar equivalents per minute under the defined above conditions.

Comparison of the Results:

| State of the Art | | | Invention | | | |
|---|---|---|---|---|---|---|
| | m | | m | Ex. 1 | m | Ex. 3 | m |
| Gc* | 1.48 | Gc* | 198 | B1/A1 | 1.73 | B3/A3 | 4.61 |
| | | | | C1/A1 | 3.19 | C3/A3 | 6.54 |
| | | | | D1/A1 | 18.02 | | |

*Gc: *Geotrichum candidum*

The results clearly show that the present invention provides for a more drastic increase in malt β-glucanase activity than that described earlier (WO 94/29430).

It thus appears that it is possible to obtain malted cereals having a β-glucanase activity increased by at least a factor 4 compared to the conventional malting process wherein the addition of microbial culture is omitted.

From FIGS. 2 and 4, it also appears that it is possible to obtain malted cereals having a xylanase activity increased by at least a factor 4 compared to conventional malting process wherein the addition of microbial culture is omitted.

EXAMPLE 4

1. Preparation of the microbial cultures
Strain
   S40: *Aspergillus oryzae* ATCC 14156
Preparation of the spore suspension
   the strain was grown on PDA (Potato Dextrose Agar, Oxoid) for approximately 7 days at 281° C.;
   the spores were harvested by flooding the culture with sterile physiological saline (0.9%/NaCl) and by rubbing the sporulated mycelium gently with a sterile spatula;
   the spore suspension was washed once with sterile physiological saline (0.9% NaCl) by centrifugation (5500 rpm. Sorval type SS-34®, for 15 min) and resuspended in sterile physiological saline (0.9% NaCl);
   the spore density was determined microscopically using a Thoma counting chamber.
Activation of the Spore Suspension
   $5 \times 10^7$ spores were transferred into 20 ml of sterile, acidified TSB (Tryptic Soy Broth, Oxoid), pH=5.0 and incubated in a shaking water bath during 3 hours (1) or 1 hour (2) at 35° C., 2. Cereal
   Clarine barley-1995 French harvest
3. Process
   Malts were made by two different malting process:
   A4. traditional malting
      (without inoculation of any spore suspension)
   E4. malting process according to the invention
      (inoculation of the steeped barley during the first and third wet stage with a suspension of activated spores of *Aspergillus oryzae* ATCC 14156)
Steeping
   as described in Example 1
Addition of the microbial cultures
   during the steeping, $5 \times 10^3$ activated spores (1) per gram air dry barley were inoculated to the water of the first wet stage and $10^4$ activated spores (2) per gram air dry barley were inoculated to the water of the third wet stage (E4);
Germination
   germination of ±460 g steeped barley was carried out in cylindrical containers with perforated lids at a temperature of 16°-18° C. during 4 days;
   air was supplied by natural diffusion;
   the containers were slowly rotated on an electronically controlled roller system (Cellroll®, Tecnorama); i.e., every two hours the containers were rolled for 15 min at 1 rpm.
Kilning
   as described in Example 1

4. Methods of the analysis and results
   These were described in Example 1 (4, Methods of Analysis and Results) Method for the determination of the acrospire length according to Analytica-European Brewery Convention (Fourth Edition, 1987, Brsuerel und Getränke-Rundschau).

| | | 0 | 0-¼ | ¼-½ | ½-¾ | ¾-1 | >1 |
|---|---|---|---|---|---|---|---|
| 1 day germination | A4 | 0 | 1 | 60 | 39 | 0 | 0 |
| 1 day germination | E4 | 0 | 0 | 11 | 77 | 12 | 0 |
| 4 days germination | A4 | 1 | 1 | 31 | 64 | 3 | 0 |
| 4 days germination | E4 | 1 | 0 | 1 | 42 | 49 | 7 |

| | Traditional Malting Process (A4) | Malting Process According to the Invention (E4) |
|---|---|---|
| Moisture | 4.3 | 4.0 |
| Extract | 80.9 | 81.1 |
| Extract Difference | 1.0 | 0.3 |
| Color | 2.8 | 3.2 |
| Wort Turbidity | 1.6 | 1.0 |
| Postcoloration | 4.8 | 5.4 |
| Total Protein Content | 10.1 | 10.0 |
| Soluble Protein Content | 3.9 | 4.5 |
| Kolbach Index | 38.6 | 44.7 |
| Viscosity | 1.57 | 1.48 |
| pH | 5.98 | 5.89 |
| Diastatic Power | 197 | 201 |
| Whole Grains | 1.3 | 0.6 |
| Friability | 81 | 89 |
| Homogeneity | 95.0 | 98.4 |
| β-glucan Content | 378 | 132 |
| Filtration Volume | 300 | 310 |
| Modification | 83.9 | 89.8 |

-continued

| | Traditional Malting Process (A4) | Malting Process According to the Invention (E4) |
|---|---|---|
| β-glucanase Activity | 309 | 392 |
| Xylanase Activity | 27.82 | 17.62 |

EXAMPLE 5

1. Preparation of the Microbial Cultures
Strains
    S40: *Aspergillus oryzae* ATCC 14156
    S46: *Rhizopus oryzae* ATCC 9363
Preparation of the Spore Suspensions
As described in Example 4
Activiation of the Spore Suspensions
S40:
    $5 \times 10^7$ spores were transferred into 20 ml of sterile, acidified TSB (Tryptic Soy Broth, Oxoid) pH=5.0 and incubated in a shaking water during 1 hour at 35° C.;
    the activated spores were harvested by centrifugation (3500 rpm, Sorvall type SS34®, for 15 min.) and resuspended in sterile physiological saline (0.9% NaCl).
S45
    $5 \times 10^7$ spores were transferred into 20 ml of sterile, activated TSB (Tryptic Soy Broth, Oxoid) pH=4.0 and incubated in a shaking water bath during 5 hours at 42° C.;
    the activated spores were harvested by centrifugation (3500 rpm, Sorvall type SS34®, for 15 min.) and resuspended in sterile physiological saline (0.9% NaCl).

2. Cereal
    Clarine-1995 French harvest

3. Process
Setup
    Malts were made by two different malting processes:
    A5. traditional malting
        (without inoculation of any spore suspension)
    F5. malting process according to the invention
        (inoculation of the steeped barley during the first wet stage with a suspension of activated spores of *Aspergillus oryzae* ATCC14156 and after steeping with a suspension of activated spores of *Rhizopus oryzae* ATCC 9363)
Steeping
As described in Example 1
Addition of the Microbial Cultures
    during steeping, $10^4$ activated spores of *Aspergillus oryzae* ATCC 14156 per gram air dry barley were inoculated to the water of the first wet stage (F5, according to the invention);
    ±460 g of steeped barley was immersed in 0.5 liters of tap water which contained no spores (A5) or activated spores of *Rhizopus oryzae* ATCC 9363 (F5, according to the invention); for F5 the steeped barley was inoculated with $10^4$ activated spores per gram air dry barley; the fluid was removed by draining.
Germination
As described in Example 4.
Kilning
As described in Example 1.

4. Methods of Analysis and Results
    These were as described in Example 1 (4. Methods of Analysis and Results).
    Method for the determination of the acrospire length according to Analytica-European Brewery Convention (Fourth Edition, 1987, Brauerei und Getränke-Rundschau).

| | | 0 | 0-¼ | ¼-½ | ½-¾ | ¾-1 | >1 |
|---|---|---|---|---|---|---|---|
| 1 day germination | A5 | 1 | 1 | 53 | 44 | 1 | 0 |
| 1 day germination | F5 | 0 | 1 | 21 | 73 | 5 | 0 |
| 4 days germination | A5 | 0 | 0 | 0 | 29 | 63 | 8 |
| 4 days germination | F5 | 0 | 0 | 0 | 13 | 63 | 24 |

It was noted that the use of activated spores of *Aspergillus oryzae* ATCC improved the malt analytical specifications.
Furthermore, it was found that during the malting process, the barley acrospire lengths were significantly longer using the process according to the invention in comparison to the traditional malting process.

| | Traditional Malting Process (A5) | Melting Process According to the Invention (F5) |
|---|---|---|
| Moisture | 3.9 | 4.2 |
| Extract | 81.4 | 81.8 |
| Extract Difference | 0.9 | 1.1 |
| Color | 38 | 3.8 |
| Wort Turbidity | 1.4 | 1.0 |
| Postcoloration | 6.9 | 6.4 |
| Total Protein Content | 10.1 | 10.2 |
| Soluble Protein Content | 4.8 | 5.2 |
| Kolbach Index | 48.0 | 51.3 |
| Viscosity | 1.51 | 1.50 |
| pH | 5.88 | 5.82 |
| Diastatic Power | 199 | 214 |
| Whole Grains | 0.8 | 1.1 |
| Friability | 89 | 95 |
| Homogeneity | 98.3 | 98.3 |
| β-glucan Content | 120 | 51 |
| Filtration Volume | 270 | 220 |
| Modification | 96.8 | 98.6 |
| β-glucanase Activity | 263 | 907 |
| Xylanase Activity | 28.86 | 57.76 |

EXAMPLE 6

1. Preparation of the Microbial Cultures
Strains
    S46: *Rhizopus oryzae* ATCC 9363
Preparation of the Spore Suspensions
As described in Example 4
Activation of the Spore Suspensions
    $5 \times 10^7$ spores were transferred into 20 ml of sterile, acidified TSB (Tryptic Soy Broth, Oxoid) pH=4.0 and incubated in a shaking water both during 5 hours at 42° C.;
    the activated spores were harvested by centrifugation (3500 rpm, Sorvall type SS-34®, for 15 min.) and resuspended in sterile physiological saline (0.9% NaCl).

2. Cereal
   Wheat: Mobil-1996 Belgian harvest
3. Process
Setup
   Malts were made by two different malting processes:
   A6. traditional malting
      (without inoculation of any spore suspension)
   D6. malting process according to the invention
      (inoculation of the steeped wheat during the first wet stage with a suspension of activated spores of Rhizopus oryzae ATCC 9363)
Steeping
   the steeping was carried out in a 2 kg base with a total water (tap water) to air ratio of 1.5:1;
   use was made of 2 fermentors (Bioflo III, New Brunswick Scientific), in which a perforated plate was placed;
   temperature was only controlled during the wet stages; during the air rest stages, the system was allowed to reach room temperature (±20° C.);
   during the whole steeping period the wheat was aerated (4 liter sterile air per minute);
   steeping was carried out by immersion using the following scheme:

|  | Temperature (° C.) | Duration (h) |
| --- | --- | --- |
| First wet stage | 13 | 6:00 |
| First air rest stage | 20 | 16:00 |
| Second wet stage | 14 | 4:00 |
| Second air rest stage | 20 | 16:00 |
| Third wet stage | 16 | 2:00 |

Addition of the Microbial Culture
   during steeping, $10^4$ activated spores of per gram air dry wheat were inoculated to the water of the first wet stage (D6);
Germination
   As described in Example 4.
Kilning
   As described in Example 1.
4. Methods of Analysis and Results
   These were as dscribed in Example 1 (4. Methods of Analysis and Result).

|  | Traditional Malting Process (A6) | Malting Process According to the Invention (D6) |
| --- | --- | --- |
| Moisture | 5.5 | 5.4 |
| Extract | 83.6 | 85.5 |
| Extract Difference | 1.0 | 0.6 |
| Color | 3.9 | 7.6 |
| Wort Turbidity | 1.4 | 1.4 |
| Postcoloratlon | 5.8 | 11.5 |
| Total Protein Content | 14.0 | 14.8 |
| Soluble Protein Content | 4.9 | 9.7 |
| Kolbach Index | 35.0 | 65.5 |
| Viscosity | 1.99 | 1.79 |
| pH | 6.02 | 5.63 |
| Diastatic Power | 183 | 193 |
| Whole Grains | 19.4 | 20.2 |
| Friability | 35 | 42 |
| Homogeneity | 79.4 | 78.7 |
| Filtration Volume | 220 | 295 |
| β-glucanase Activity | 10.9 | 16,640 |
| Xylanase Activity | 16.85 | 1,620.1 |

EXAMPLE 7

1. Preparation of the Microbial Cultures
Strain
   S46: Rhizopus oryze ATCC 9363
Preparation of the Spore Suspension
   the strain was grown on PDA (Potato Dextrose Agar, Oxoid) for approximately 7 days at 28° C.;
   the spores were harvested by flooding the culture with sterile physiological saline (0.9% NaCl) and by rubbing the sporulated mycelium gently with a sterile spatula;
   the spore suspension was washed once with sterile physiological saline (0.9% NaCl) by centrifugation (3500 rpm, Jouan C312, for 15 min.) and resuspended in sterile physiological saline (0.9% NaCl);
   the spore density was determined microscopically using a Thoma counting chamber.
Activation of the Spore Suspension
   $5 \times 10^7$ spores were transferred into 20 ml of sterile, acidified TSB (Tryptic Soy Broth, Oxoid) pH=4.0 and incubated in a shaking water bath during 5 hours at 42° C.
2. Cereal
   Sorghum (S14)
3. Process
Setup
   Malts were made by two different malting processes:
   A7. traditional malting
      (without inoculation of any spore suspension)
   D7. malting process according to the invention
      (inoculation of the sorghum during the first wet stage with a suspension of activated spores of Rhizopus oryzae ATCC 9363).
Cleaning
   washing of the sorghum is performed by using 6 liters tap water per kilogram sorghum and by removing the excess water.
Steeping
   the steeping was carried out in a 2 kg base with a total water (top water) to air ratio of 1.5:1;
   use was made of 2 fermentors (Bioflo III, New Brunswick Scientific), in which a perforated plate was placed;
   temperature was only controlled during the wet stages; during the air rest stages, the system was allowed to reach room temperature (±20° C.);
   during the whole steeping period the barley was aerated (2 liter sterile air per minute);
   steeping was carried out by immersion using the following scheme:

|  | Temperature (° C.) | Duration (h) |
| --- | --- | --- |
| First wet stage | 28 | 10:00 |
| First air rest stage | 20 | 4:00 |
| Second wet stage | 28 | 10:00 |
| Second air rest stage | 20 | 4:00 |
| Third wet stage | 28 | 10:00 |
| Third air rest stage | 20 | 4:00 |

Addition of the Microbial Cultures
   during steeping, $10^4$ activated spores (1) per gram air dry sorghum were inoculated to the water of the first wet stage (D7).

Germination germination of ±460 g steeped sorghum was carried out in cylindrical container with perforated lids at a temperature of 28° C. during 4 days;

air was supplied by natural diffusion;

the containers were slowly rotated on an electronically controlled roller system (Cellroll®, Tecnorama); i.e., every two hours the containers were rolled for 15 min. at 1 rpm.

Kilning

As described in Example 1.

4. Method of Analysis and Results

These were as described in Example 1 (4. Methods of Analysis and Results).

|  | Traditional Malting Process (A7) | Malting Process According to the invention (D7) |
|---|---|---|
| β-glucanase Activity | 98 | 991 |
| Xylanase Activity | 524.72 | 413.43 |

What is claimed is:

1. A process for the preparation of a malted cereal comprising: introducing activated spores in an amount of about 1×10$^2$ to about 1×10$^7$ per gram of dry cereal to a cereal before or during a malting process, the activated spores being present on the cereal in an amount which is effective for providing the malted cereal with an increased enzyme activity, the increased enzyme activity being greater than the enzyme activity which is obtained by the same malting process but with dormant spores.

2. The process according to claim 1, wherein said enzyme is selected from the group of B-glucanase, xylanase, amylase, a protease, naturally occurring enzymes in the cereal and combinations thereof.

3. A process as recited in claim 2 wherein the process further comprises drying the combination and prior to the drying, the combination is held until the cereal has a moisture content of between about 20 to about 60 weight percent and the cereal has germinated for about 2 to about 7 days at a temperature of from about 10 to about 30° C.

4. The process according to claim 1, wherein said activated spores increase an activity of an enzyme that is present in a cereal used during said making process.

5. A process for the preparation of a malted cereal as recited in claim 4 wherein the cereal, water and activated spores are combined to form a combination and where the concentration of the activated spores and the combination is held together for a time and temperature which are effective for providing the malted cereal with an enzyme activity which is greater than the enzyme activity which is obtained by a malting process without activated spores.

6. A process as recited in claim 5 wherein the combination is held for a time and temperature until the ceral has a moisture content of at least about 20 weight percent.

7. A process as recited in claim 5 or 6 wherein the combination is held until the cereal germinates and after germination, cereal is dried to a moisture content of not more than about 15 weight percent.

8. A process as recited in claim 7 wherein the process further comprises drying the combination and prior to drying, the combination is held until the cereal has a moisture content of between about 20 to about 60 weight percent and the cereal has germinated for about 2 to about 7 days at a temperature of from about 10 to about 30° C.; and after the germination, the combination is dried to a moisture content of from about 2 to about 15 weight percent.

9. A process as recited in claim 1 or 5 wherein the activated spores are from microbes selected from the group consisting of *Micrococcus* spp., *Streptococcus* spp., *Leuconostoc* spp., *Pediococcus* spp., *Pediococcus halophilus*, *Pediococcus cerevisiae*, *Pediococcus damnosus*, *Pediococcus hemophilus*, *Pediococcus soyae*, *Lactococcus* spp., *Lactobacillus* spp., *Lactobacillus acidophilus*, *Lactobadillus amylovorus*, *Lactobacillus bavaricus*, *Lactobacillus bifermentans*, *Lactobacillus brevis var lindneri*, *Lactobacillus casel var casel*, *Lactobacillus delbrueckil*, *Lactobacilius delbrueckil var lactis*, *Lactobacilius delbrueckil var bulgaricus*, *Lactobacillus fermenti*, *Lactobacillus gasseril*, *Lactobacillus helveticus*, *Lactobacillus hilgardil*, *Lactobacillus renteril*, *Lactobacilius sake*, *Lactobacillus sativorius*, *Lactobacillus cremoris*, *Lactobacillus kefir*, *Lactobacillus pentoceticus*, *Lactobacillus cellobiosus*, *Lactobacillus bruxellensis*, *Lactobacillus buchnerii*, *Lactobacillus coryneformis*, *Lactobacillus confusus*, *Lactobacillus florentinus*, *Lactobacillus viridescens*, *Corynebacterium* spp., *Propiombacrerium* spp., *Bifidobacrerium* spp., *Streptomyces* spp., *Bacillus* spp., *Sporofactobacilius* spp., *Acetobacter* spp., *Agrobacterium* spp., *Alcaligenes* spp., *Pseudomonas* spp., *Pseudomonas amylophilia*, *Pseudomonas aeruginosa*, *Pseudomonas cocovenenans*, *Pseudomonas mexicana*, *Pseudomonas pseudomaliei*, *Gluconobacter* spp., *Enterobacter* spp., *Erwinia* spp., *Klebsiella* spp., *Proteus* spp., *Ascomycota*, *Dothideales*, *Mycosphaerellaceae*, *Mycosphaerella* spp., *Venturiaceae*, *Venturia* spp., *Eurotiales*, *Monascaceae*, *Monascus* spp., *Trichocomaceae*, *Emeridilla* spp., *Duroteum* spp., *Eupendillium* spp., *Neosartorya* spp., *Talaromyces* spp., *Hypocreales*, *Hypocreceae*, *Hypocrea* spp. *Saccharomycetales*, Dipodascaceae, *Dipodascus* spp., *Galactomyces* spp., *Endomycetaceae*, *Endomyces* spp., *Metschnikowiaceae*, *Guilliermondella* spp., *Saccharomycetaceae* *Debaryomyces* spp., *Dekkera* spp., *Pichia* spp., *Kluyveromyces* spp., *Saccharomyces* spp., *Torulaspora* spp., *Zygosacchaaromyces* spp., *Saccharomycodaceae*, *Hansenlaspora* spp., *Schizosaccharomycetales*, *Schizosaccbromycetaceae*, *Schizosaccharomyces* spp., *Sordariales*, *Chaetomiaceae*, *Chaetomium* spp., *Sordariaceae*, *Neurospora* spp., *Zygomycota*, *Mucorales*, *Mucoraceae*, *Absidia* spp., *Amylomyces* spp., *Rhizomucor* spp., *Actinomucor* spp., *Thermomucor* spp., *Chiamydomucor* spp., *Mucor* spp., *Muco circinelloides*, *Mucor grisecyanus*, *Mucor hiemalis*, *Mucor Indicus*, *Mucor mucedo*, *Mucor piriformis*, *Mucor plumbeus*, *Mucor praini*, *Mucor pusillus*, *Mucor silvaticus*, *Mucor javanicus*, *Mucor racemosus*, *Mucor rouxianus*, *Mucor rouxil*, *Mucor aroinatiacus*, *Mucor flavus*, *Mucor miehd*, *Rhizopus* spp., *Rhizopus arrhizus*, *Rhizopus oligosporus*, *Rhizopus oryzae*, strains ATCC 4858, ATCC 9363, NRRL 1891, NRRL 1472, *Rhizopus stolonifer*, *Rhizopus thailandensis*, *Rhizopus formosaensis*, *Rhizopus chinensis*, *Rhizopus cohnil*, *Rhizopusjaponicus*, *Rhizopus riodosus*, *Rhizopus delemar*, *Rhizopus acetorinus*, *Rhizopus chiamydosporus*, *Rhizopus circinans*, *Rhizopus javanicus*, *Rhizopus peka*, *Rhizopus sako*, *Rhizopus tritiel*, *Rhizopus niveus*, *Rhizopus rnicrosporus*, *Mitosporic fungi preferentially Aureobasidium* spp., *Acremonium* spp., *Cercospora* spp, *Epicoccum* spp., *Monilia* spp., *Manila candida*, *Monilla sitophilia*, *Mycoderma* spp., *Candida* spp., *Candida diddensiae*, *Candida edax*, *Candida etchellel*, *Candida kefir*, *Candida krisei*, *Canclida lactosa*, *Candida lambica*, *Candida melinil*, *Candida utiuis*, *Candida mullen*, *Candida mycoderma*, *Candida parapsiosis*, *Candida obrux*, *Candida*

*tropicalls, Candida valida, Canclida versatiis, Candida guilliermondil, Rhodotorula* spp., *Torulopsis* spp., *Geotrichum* spp., *Geotrichum amycelium, Geotrichum armillariae, Geotrichum asteroides, Geotrichum bipunctatum, Georrichum dulcitum, Georrichum eriense, Geotrichum fici, Geotrichum flavo-brunneum, Geotrichum fragrans, Geotrichum grade, Geotrichum heritum, Geotrichum kiebaknil, Geotrichum penicillatum, Geotrichum hirtum, Geotrichum pseudocandidum, Geotrichum rectangulatum, Geotrichum suaveolens, Geotrichum vanrylae, Geotrichum loubieri, Geotnichum microsporum, Cladosporfum* spp., *Trichoderma* spp., *Trichoderma hamatum, Trichoderma harzianum, Tnichoderina koningli, Trichoderma pseudokoningil, Tnichoderma reesei, Trichoderma virgatum, Trichoderma viride, Oidiumeap* spp., *Alternariaea* spp., *Alternaria alternata, Alternaria tenuls, Helminthosporium* spp., *Heiminthosponium gramineum, Helininthosporium sativum, Helminthosporium teres, Aspergillus* spp., *Aspergilius ochraseus* Group, *Aspergilius nidulans* Group, *Aspergillus versicolor* Group, *Aspergillus wentil* Group, *Aspergillus candidus* Group, *Aspergillus flavus* Group, *Aspergillus niger* Group, *Penicillum* spp., *Penicillum aculeatum, Penicillum citrinum, Penicillum claviforme, Penicillum funiculosum, Penicillum Italicum, Penicillum lanoso-viride, Penicillum emersonii, Penicillum lilacinum, Penicillum expansum* and mixtures thereof.

10. A process for the preparation of a malted cereal said process comprising:
   (a) introducing activated spores in an amount of from about 1×10² to about 1×10⁷ per gram of dry cereal into a moistened cereal to form a moistened cereal/activated spore combination;
   (b) germinating the cereal in the moistened cereal/activated spore combination to provide a germinated cereal, the activated spores being present in the cereal in an amount which is effective for providing the germinated cereal with an increased enzyme activity, the increased enznne activity being greater than the enzyme activity which is obtained by the same making process but with dormant spores; and
   (c) drying said germinated cereal.

11. The process according to claim 10, wherein said moistened cereal/activated spore combination is held at a temperature of from about 5° to about 30° C. until the cereal has a moisture content of from about 20 to about 60 weight percent moisture.

12. The process according to claim 10 or claim 11, wherein the moistened cereal/activated spore combination is held for about 3 to about 6 days at a temperature of from about 10° to about 30° C.

13. The process according to claim 10 or 11, wherein said germinated cereal is dried to a moisture content of from about 2 to about 15 weight percent.

14. A process as recited in claim 10 wherein the combination is held at a temperature of from about 10° C. to about 20° C. until the cereal has a moisture content of from about 38 to about 47 weight percent and the cereal has germinated for about 3 to about 6 days at a temperature of from about 14° C. to about 18° C. and the germinated cereal is dried at a temperature of from about 40° C. to about 15° C.

15. A process for the preparation of a malted cereal said process comprising: mixing water, a cereal and activated spores to provide a moistened cereal/activated spore combination, the activated spores in an amount of from about 1×10² to about 1×10⁷ per gram of dry cereal, and holding moistened cereal/activated spore combination for a time and at a temperature, the amount of the activated spores, holding time and holding temperature effective for providing the malted cereal with an increased activity of an enzyme compared to the activity of an enzyme obtained by moistening and mixing the cereal with dormant spores.

16. The process according to claim 15, wherein said enzyme is selected from the group of B-glucanase, xylanase, amylase, a protease, naturally occurring enzymes in the cereal and combinations thereof.

17. A process as recited in claim 15, wherein the holding time and holding temperature are effective to provide the cereal with a moisture content of at least about 20 weight percent.

18. A process as recited in claim 17 wherein after cereal attains a moisture content of at least about 20 weight percent, it is dried to a moisture content of not more than about 15 weight percent.

19. A process as recited in claim 15, 16, 17, or 18, wherein the holding time and holding temperature are effective to provide the cereal with a moisture content of between about 20 to about 60 weight percent and wherein the cereal has germinated for about 2 to about 7 days at a temperature of from about 20 to about 30° C.

20. A process as recited in claim 19, wherein the germinated cereal is dried to a moisture content of from about 2 to about 15 weight percent.

21. A process as recited in claim 20 wherein the activated spores are from the microbes selected from the group consisting of *Micrococcus* spp., *Streptococcus* spp., *Leuconostoc* spp., *Pediococcus* spp., *Pediococcus halophilus, Pediococcus cerevisiae, Pediococcus damnosus, Pediococcus hemophilus, Pediococcus soyae, Lactococcus* spp., *Lactobacillus* spp., *Lactobacillus acidophilus, Lactobacillus amylovorus, Lactobacillus bavaricus, Lactobacillus bifermentans, Lactobacillus brevis var lindneri, Lactobacillus casel var casd, Lactobacillus deibrueckil, Lactobacillus delbrueckil var lactis, Lactobacillus deibrueckil var bulgaricus, Lactobacillus fermenti, Lactobacillus gasseril, Lactobacillus helveticus, Lactobacillus bilgardil, Lactobacillus renteril, Lactobacillus sake, Lactobacillus sativorius, Lactobacillus cremoris, Lactobacilius kefir, Lactobacillus pentocecicus, Lactobacillus cellobiosus, Laccobacillus bruxellensis, Lactobacilius buchnerli, Lactobacillus coryneforrnis, Lactobacillus confusus, Lactobacillus florentinus, Lactobacillus viridescens, Corynebacterium* spp., *Propionibacterium* spp., *Bifidobacterium* spp., *Streptomyces* spp., *Bacillus* spp., *Sporofactobacillus* spp., *Acetobacter* spp., *Agrobacterium* spp., *Alcaligenes* spp., *Pseudomonas* spp., *Pseudomonas amylophilia, Pseudomonas aeruginosa, Pseudomonas cocovenenans, Pseudomonas mexicana, Pseudomonas pseudomallei, Gluconobacter* spp., *Enterobacter* spp., *Erwinia* spp., *Klebsiella* spp., *Proteus* spp., *Ascomycota, Dothideales, Mycosphaereliaceae, Mycosphaerella* spp., *Venturiaceae, Venturia* spp., *Eurotiales, Monascaceae, Monascus* spp., *Trichocomaceae, Emericilla* spp., *Duroteum* spp., *Eupencillium* spp., *Neosartorya* spp., *Talaromyces* spp., *Hypocreales, Hypocreceae, Hypocrea* spp. *Saccharomycetales, Dipodascaceae, Dipodascus* spp., *Galactomyces* spp., *Endomycetaceae, Endomyces* spp., *Metscbnikowiaceae, Guilliermondella* spp., *Saccharomycetaceae Debaryomyces* spp., *Dekkera* spp., *Pichia* spp., *Kluyveromyces* spp., *Saccharomyces* spp., *Torulaspora* spp., *Zygosacchaaromyces* spp., *Saccharomycodaceae, Hanserilaspora* spp., *Schizosaccharomycetales, Schizosacchromycetaceae, Schizosaccharomyces* spp., *Sordariales, Chaetomiaceae, Chaeromium* spp., *Sordariaceae, Neurospora* spp., *Zygomycota, Mucorales, Mucoraceae, Absidia* spp., *Amylomyces* spp., *Rhizomucor* spp., *Actinomucor* spp.,

*Thermomucor* spp., *Chiamydomucor* spp., *Mucor* spp., *Muco cfrcinelloides, Mucor grisecyanus, Mucor hiemalls, Mucor Indicus, Mucor mucedo, Mucor piriformis, Mucor plumbeus, Mucor praini, Mucor pusillus, Mucor silvaticus, Mucor javanicus, Mucor racemosus, Mucor rouxianus, Mucor rouxli, Mucor aromatiacus, Mucor flavus, Mucor miehel, Rhizopus* spp., *Rhizopus arrhizus, Rhizopus oligosporus, Rhizopus oryzae*, strains ATCC 4858, ATCC 9363, NRRL 1891, NRRL 1472, *Rhizopus stolonifer, Rhizopus thailandensis, Rhizopus formosaensis, Rhizopus chinensis, Rhizopus cohnil, Rhizopus japonicus, Rhizopus nodosus, Rhizopus delemar, Rhizopus acetorinus, Rhizopus chiamydosporus, Rhizopus circinans, Rhizopus javanicus, Rhizopus peka, Rhizopus salto, Rhizopus tritiel, Rhizopus niveus, Rhizopus microsporus, Mitosporic fungi preferentialiy Aureobasidium* spp., *Acremonium* spp., *Cercospora* spp., *Epicoccum* spp., *Monilla* spp., *Monilla canclida, Monilla sitophilia, Mycoderma* spp., *Candida* spp., *Candida diddensiae, Candida edax, Candida etchellel, Candida kefir, Candida krisei, Candida lacrosa, Canclida lambica, Candida melinil, Candida utilis, Candida milleri, Candida mycoderma, Candida parapsiosis, Candida obtux, Candida tropicalls, Candida valida, Candida versatilis, Candida guilliermondil, Rhodotorula* spp., *Torulopsis* spp., *Geotrichum* spp., *Geotrichum amycelium, Geotrichum armillariae, Geotrichum asteroides, Geotrichurn bipunctatum, Geotrichum dulcirum, Geotrichum eriense, Geotrichum fici, Geotrichum flavo-brunneum, Geotrichum fragrans, Geotrichum grade, Geotrichum herirum, Geotrichum kiebaknil, Geotrichum penicillatum, Geotrichum birtum, Geotrichurn pseudocandidum, Geotrichum recrangularum, Geotrichum suaveolens, Geotrichum vanrylae, Geotrichum loubieri, Georrichum nilcrosporum, Cladosporfum* spp., *Trichoderma* spp., *Trichoderma hamatum, Trichoderma harzianum, Trichoderma koningli, Trichoderma pseudokoningil, Trichoderma reesei, Trichoderina virgatum, Trichoderma viride, Oidium* spp., *Alternaria* spp., *Alternaria alternata, Alternaria tenuls, Helminthosporium* spp., *Heiminthosporium grarnineum, Helininthosporium sativum, Helminthosporium teres, Aspergilius* spp., *Aspergillus ochraseus* Group, *Aspergillus nidulans* Group, *Aspergillus versicolor* Group, *Aspergillus wentil* Group, *Aspergillus candidus* Group, *Aspergillus flavus* Group, *Aspergilius niger* Group, *Penicillum* spp., *Penicillum aculeatum, Penicillum citrinum, Penicillum claviforme, Penicillum funiculosum, Penicillum Italicum, Penicillum lanoso-viride, Penicillum emersonii, Penicillum lilacinum, Penicillum expansum* and mixtures thereof.

22. A process for the preparation of malted cereal comprising:
steeping the cereal, the steeping including one or more wetting stages at a temperature between about 5° to about 30° C., the wetting stages effective for providing a material having a moisture content between about 20% and about 60% by weight;
germinating the cereal in the presence of activated spores for about 2 to about 7 days at a temperature between about 10° to about 30° C., to provide a germinated cereal,
the activated spores being from microbes selected from the group consisting of bacteria, fungi, and mixtures thereof and being added to the cereal prior to or during the steeping or the germinating of the cereal, the activated spores being present in an amount of from about $1 \times 10^2$ to about $1 \times 10^7$ per gram of dry cereal and being present in the cereal in an amount which is effective for providing the germinated cereal with an increased enzyme activity, the increased enzyme activity being greater than the enzyme activity which is obtained by the same malting process but with dormant spores;
drying the steeped and germinated cereal at a temperature of from about 40° to about 150° C. until the steeped and germinated cereal has a moisture content between about 2% to about 15% by weight.

23. A process according to claim 22, wherein the cereal is barley and, wherein the bacteria are selected from the group consisting of *Micrococcus* spp., *streptococcus* spp., *Leuconostoc* spp., *Pediococcus* spp. preferentially *Pediococcus halophilus, Pediococcus cerevisiae, Pediococcus* spp. preferentially *Pediococcus halophilus, Pediococcus cerevisiae, Pediococcus damnosus, Pediococcus hemophilus, Pediococcus parvulus, Pediococcus soyae, Lactococcus* spp., *Lactobacilius* spp. preferentially *Lactobacillus acidophilus, Lactobacillus amylovorus, Lactobacillus bavaricus, Lactobacillus bifermentans, Lactobacillus brevis var lindneri, Lactobacillus casel var casel, Lactobacillus delbrueckil, Lactobacillus delbrueckil var lactis, Lactobacillus delbrueckil var bulgaricus, Lactobacillus ferinenti, Lactobacillus gasseril, Lactobacillus helveticus, Lactobacillus hilgardil, Lactobacillus renteril, Lactobacillus sake, Lactobacillus sativorius, Lactobacillus cremoris, Lactobacillus kefir, lactobacillus pentoceticus, Lactobacdlus cellobiosus, Lactobacillus bruxellensis, Lactobacillus buchnerii, Lactobacillus coryneformis, Lactobacillus confusus, Lactobacillus florentinus, Lactobacillus viridescens, Corynebaceerium* spp., *Propionibacterium* spp., *Bifidobacterium* spp., *Streptomyces* spp., *Bacifius* spp., *Sporofactobadiflus* spp., *Acetobacter* spp., *Agrobacterium* spp., *Alcaligenes* spp., *Pseudomonas* spp. preferentially *Pseudomonas amylophilia, Pseudomonas seruginosa, Pseudomonas cocovenenana, Pseudomonas mexicana, Pseudomonas pseudomallei Gluconobacter* spp., *Enterobacter* spp., *Erwinia* spp., *Kiebstella* spp., and *Proteus* spp.

24. A process according to claim 23, wherein the *Pseudomonas* sp. is *Pseudomonas herbicola*.

25. The process according to claim 22, wherein the cereal is barley and wherein the fungi are selected from the group consisting of *Ascomycota, Dothideales, Mycosphaerellaceae, Mycosphaerella* spp., *Venturiaceae, Venturia* spp.; *Eurotiales, Monascaceae, Monascus* spp., *Trichocomaceae, Emericilla* spp., *Duroteum* spp., *Eupencillium* spp., *Neosartorya* spp., *Talaromyces* spp., *Hypocreales, Hypocreceae, Hypocrea* spp. *Saccharomycetales, Dipodascaceae, Dipodascus* spp., *Galactomyces* spp., *Endomycetaceae, Endomyces* spp., *Metschnikowiaceae, Guillierinondella* spp., *Saccharomycetaceae Debaryomyces* spp., *Dekkera* spp., *Pichia* spp., *Kluyveromyces* spp., *Saccharomyces* spp., *Torulaspora* spp., *Zygosacchaaromyces* spp., *Saccharomycodaceae, Hansenlaspora* spp., *Schizosaccharomycetales, Schizosaccbromycetaceae, Schizosaccharomyces* spp., *Sordariales, Chaetomiaceae, Chaetomium* spp., *Sordariaceae, Neurospora* spp., *Zygomycota, Mucorales, Mucoraceae, Absidia* spp., *Amylomyces* spp., *Rhizomucor* spp., *Actinomucor* spp., *Thermomucor* spp., *Chiamydomucor* spp., Mucor spp., *Muco circinelloides, Mucor grisecyanus, Mucor hiemalls, Mucor Inclicus, Mucor mucedo, Mucor piriformis, Mucor plumbeus, Mucor praini, Mucor pusillus, Mucor silvaticus, Mucor javanicus, Mucor racemosus, Mucor rouxianus, Mucor rouxli, Mucor aromatiacus, Mucor flavus, Mucor miehel, Rhizopus* spp., *Rhizopus arrbizus, Rhizopus oligosporus, Rhizopus oryzae*, strains ATCC 4858, ATCC 9363, NRRL 1891, NRRL 1472, *Rhizopus stoloriifer, Rhizopus thailandensis, Rhizopus formosaensis, Rhizopus chin-* ensis, *Rhizopus cohnil, Rhizopus japonicus, Rhizopus nodosus, Rhizopus delemar, Rhizopus acetorinus, Rhizopus chlamydosporus, Rhizopus circinans, Rhizopus javanicus, Rhizopus peka, Rhizopus salto, Rhizopus tritiel, Rhizopus niveus, Rhizopus microsporus, Mitosporic fungi* preferentially *Aureobasidium* spp., *Acremonium* spp., *Cercospora* spp., *Epicoccum* spp., *Monilla* spp., *Morijila candida, Monilla sitophilia, Mycoderma* spp., *Candida* spp., *Candida diddensiae, Candida edax, Candida etchellel, Candida kefir, Candida krisei, Candida lactosa, Candida lambica, Candida melinil, Candida utilis, Candida milleri, Candida mycoderma, Candida parapsiosis, Candida obtux, Candida tropicalls, Candida valida, Candida versatilis, Candida guilliermondil, Rhodotorula* spp., *Torulopsis* spp., *Geotrichum* spp., *Geotrichum amycelium, Geotrichum armillariae, Geotrichum asteroides, Geotrichum bipunctarum, Geotrichum dulcirum, Geotrichum eriense, Geotrichum fici, Georrichum flavo-brunneum, Geotrichum fragrans, Geotrichum gracile, Georrichum heritum, Geotrichum kiebaknil, Georrichum penicillatum, Georrichum hirtum, Georrichum pseudocandidum, Geotrichum rectangularum, Geotrichum suaveolens, Georrichum vanrylae, Georrichum loubieri, Geotrichum inicrosporum, Cladosporfum Trichoderina* spp., *Trichoderma hamarum, Trichoderma harzianum, Trichoderma koningli, Trichoderma pseudokoningil, Trichoderma reesei, Trichoderma virgatum, Trichoderma viride, Qidium* spp., *Alternaria* spp., *Alternaria alternata, Alternaria tenuls, Helminthosporium* spp., *Heiminthosporium gramineum, Heirninthosporium sativum, Helminthosporium teres, Aspergilius* spp., *Aspergillus ochraseus* Group, *Aspergifius nidulans* Group, *Aspergillus versicolor* Group, *Aspergillus wentil* Group, *Aspergillus canclidus* Group, *Aspergillus flavus* Group, *Aspergilius niger* Group, *Penicillum* spp., *Penicillum aculeatum, Penicilium citrinum, Penicillum claviforme, Penicillum funiculosum, Penicillum Italicum, Penicillum lanoso-viride, Penicillum emersonil, Penicillum hlacinum,* and *Penicillum expansum.*

26. The process for the preparation of malted cereal according to claim 22 wherein the bacteria are selected from the group consisting of *Micrococcus* spp., *Streptococcus* spp., *Leuconostoc* spp., *Pediococcus* spp., *Lactococcus* spp., *Lactobacillus* spp., *Corynebacterium* spp., *Propionibacterium* spp., *Bifidobacterium* spp., *Streptomyces* spp., *Bacillus* spp., *Sporolactobacillus* spp., *Gluconobacter* spp., *Enterobacter* spp., *Erwinia* spp., *Klebsiella* spp., and *Proteus* spp.

27. A process for the preparation of malted cereal according to claim 22 wherein the fungi are selected from the group consisting of *Ascomycota, Dothideales, Mycosphaerellaceae, Mycosphaerella* spp., *Venturiaceae, Venruria* spps., *Eurotiales, Monascaceae, Monascus* spp., *Trichocomaceae, Emercilla* spp., *Euroteum* spp., *Eupencillium* spp., *Neosarrorya* spp., *Talaromyces* spp., *Hypocreales, Hypocreceae, Hypocrea* spp., *Saccharomycetales, Dipodascaceae, Dipodascus* spp., *Galactomyces* spp., *Endomycetaceae, Endomyces* spp., *Metscbnikowiaceae, Guilliermondella* spp., *Saccharomycetaceae, Debaryomyces* spp., *Dekkera* spp., *Pichia* spp., *Klyveromyces* spp., *Sacchaaroinyces* spp., *Torulaspora* spp., *Zygosaccharomyces* spp., *Sacchaaromycodaceae, Hansenlaspora* spp., *Schizosaccharomycetales, Schizosaccharomycetaceae, Scbizosaccharomyces* spp., *Sordariales, Chaetomiaceae, Chaetomium* spp., *Sordariscese, Neurospora* spp., *Zygomycota, Mucorales, Mucoraceae, Absidia* spp., *Amylomyces* spp., *Rhizoniucor* spp., *Actinomucor* spp., *Thermomucor* spp., *Chiamydomucor* spp., *Mucor* spp., *Rhizopus* spp., *Mitosporic fungi, Aureobasidum* spp., *Acremonium* spp., *Cerocospora* spp., *Epicoccum* spp., *Monilia* spp., *Mycoderma* spp., *Candida* spp., *Rhodotorula* spp., *Torulopsis* spp., *Geotrichum* spp., *Cladosporium* spp., *Trichoderma* spp., *Oidium* spp., *Alternara* spp., *Helminthosporium* spp., *Aspergillus* spp., and *Penicillium* spp.

28. A process according to the claim 27, wherein the *Rhizopus* spp. is *Rhizopus oryzae.*

29. A process according to claim 22, 23, 25, 26 or 27, wherein the cereal is submersed in water to steep the cereal and a total time of submersion in the water during steeping does not exceed about 30 hours, and wherein the drying is at more than two temperatures and wherein the activated spores are from microbes selected from the group consisting of *Rhizopus* spp., *Pseudomonas* spp., and mixtures thereof.

30. A process according to claim 22, wherein the activated spores are activated by treatments selected from the group consisting of cycles of wetting and/or drying, addition of nutritional supplies or addition of spore elements, exposure to temperature changes within a range of about 0° to about 80° C., and exposure to changes in pH within a pH range of about 2.0 to about 8.0 to obtain spores where the size of the spores is increased by a factor between about 1.2 and about 10 over their dormant size and/or the spores have one or more germ tubes per spore, and mixtures thereof.

31. A process according to claim 22, wherein the pH during the steeping step is adjusted to a value between about 4.0 and about 6.0.

32. A method for the preparation of a malted cereal product, the method comprising:
mixing water, activated spores and a cereal to provide a making cereal composition, the activated spores being present in the malting cereal composition in an amount of about $1 \times 10^2$ to about $1 \times 10^7$ per gram of air dry cereal, the amount of activated spores being effective for providing the malted cereal with the increased enzyme activity, the increased enzyme activity being greater than the enzyme activity which is obtained by the same making process but with dormant spores.

33. The method as recited in claim 32, wherein said enzyme is selected from the group of β-glucanase, xylanase, amylase, protease, naturally occurring enzymes in the cereal and combinations thereof.

34. A method as recited in claim 33 wherein the activated spores are from the microbes selected from the group consisting of *Micrococcus* spp., *Streptococcus* spp., *Leuconostoc* spp., *Pediococcus* spp., *Pediococcus halophilus, Pediococcus cerevisiae, Pediococcus damnosus, Pediococcus hemophilus, Pediococcus parvulus, Pediococcus soyae, Lactococcus* spp., *Lactobacillus* spp., *Lactobacillus acidophilus, Lactobacillus amylovorus, Lactobacillus bavaricus, Lactobacillus bifermentans, Lactobaciiius brevis var lindneri, Lactobacillus casei var casei, Lactobacilius delbrueckii, Lactobacifius deibrueckli var lactis, Lactobacillus delbrueckii var bulgaricus, Lactobacillus fermenti, Lactobacillus gasserii, Lactobacillus helveticus, Lactobacillus hilgardii, Lactobacillus renterti, Lactobacillus sake, Lactobacilius sativorius, Lactobacillus cremoris, Lactobacillus kefir, Lactobacillus pentoceticus, Lactobacillus cellobiosus, Lactobacillus bruxellensis, Lactobacilius buchnerli, Lactobacillus coryneforrnis, Lactobacillus confusus, Lactobacillus florentinus, Lactobacillus viridescens, Corynebacterium* spp., *Propionibacterium* spp., *Bificlobacterium* spp., *Streptomyces* spp., *Bacillus* spp., *Sporolactobacillus* spp., *Acetobacter* spp., *Agrobacterium* spp., *Alcaligenes* spp., *Pseudomonas* spp., *Pseudomonas amylophilia, Pseudomonas aeruginosa, Pseudomonas cocovenenans, Pseudomonas mexicana, Pseudomonas pseudomallei, Gluconobacter* spp., *Enterobacter* spp., *Erwinia* spp., *Kiebsiella* spp., *Proteus* spp., *Ascomycota, Dotbideales, Mycosphaerellaceae,*

Mycosphaerelia spp., Venturiaceae, Venruria spp., Eurotiales, Monascaceae, Monascus spp., Trichocomaceae, Emericilla spp., Euroteum spp., Eupenicillium spp., Neosartorya spp., Talaromyces spp., Hypocreales, Hypocreceae, Hypocrea spp., Saccharomycetales, Dipodascaceae, Dipodascus spp., Galactomyces spp., Endomycetaceae, Endomyces spp., Metschnikowiaceae, Guilliermondella spp., Saccharomycetaceae, Debaryomyces spp., Dekkera spp., Pichia spp., Kluyveromyces spp., Saccharomyces spp., Torulaspora spp., Zygosaccharomyces spp., Saccharomycodaceae, Hanseniaspora spp.; Schizosaccharomycetales, Schizosaccharomycetaceae, Schizosaccharomyces spp., Sordariales, Chaetomiaceae, Chaetomium spp., Sordariacea, Neurospora 5afr., Zygomycota, Mucorales, Mucoraceae, Absidia spp., Amylomyces spp., Rhizomucor spp., Actinomucor spp., Thermomucor spp., Chlamydomucor spp., Mucor spp., Mucor circinelloides, Mucor grisecyanus, Mucor hiemalis, Mucor indicus, Mucor mucedo, Mucor piriformis, Mucor plumbeus, Mucor praini, Mucor pusilius, Mucor silvaticus, Mucor javanicus, Mucor racemosus, Mucor rouxianus, Mucor rouxii, Mucor aromaticus, Mucor flavus, Mucor miehei, Rhizopus spp., Rhizopus arrhizus, Rhizopus oligosporus, Rhizopus oryzae, Rhizopus oryzae strain ATCC 4858, Rhizopus oryzaestrain ATCC 9363, Rhizopus oryzae strain NRRL 1891, Rhizopus oryzae strain NRRL 1472, Rhizopus stolonifer, Rhizopus thailandensis, Rhizopus formosaensis, Rhizopus chinensis, Rhizopus cohnii, Rhizopus japonicus, Rhizopus nodosus, Rhizopus delemar, Rliizopus acetorinus, Rhizopus chiamydosporus, Rhizopus circinans, Rhizopus javanicus, Rhizopus peka, Rhizopus saito, Rhizopus tritici, Rhizopus niveus, Rhizopus microsporus, Mitosporic fungi, Aureobasidium spp., Acrernonium spp., Cercospora spp., Epicoccum spp., Monilia spp., Monilia canclida, Monilia sitophila, Mycoderma spp., Candida spp., Candida diddensiae, Candida edax, Candida etchellsii, Candida kefir, Candida krisei, Candida lactosa, Candida lambica, Candida melinji, Candida utiis, Candida mullen, Candida mycoderma, Candida parapsiosis, Candida obtux, Candida tropicalis, Candida valida, Candida versatilis, Candida guillierrnondii, Rhodotorula spp., Torulopsis spp., Geotrichum spp., Geotrichum amycelium, Geotrichum armillaniae, Geotrichum asteroides, Geotrichum bipunctarum, Geotrichum dulcitum, Geornichum eniense, Geotnichum fici, Geotnichuin flavo-brunneum, Geotrichum fragrans, Geotnichum grade, Geotrichum henitum, Geotnichum klebaknii, Geornichum penicillatum, Geotnichum birtum, Geotnichum pseudocandiduin, Geotnichum rectangularum, Geotnichum suaveolens, Geornichum vanryiae, Geotrichum loubieri, Geotnichum microsporum, Cladosponium spp., Tnichoderma spp., Tnichoderma hamatum, Tnichoderma harzianum, Tnichoderma koningii, Tnichoderma pseudokoningii, Tnichoderrna reesei, Trichoderma virgatum, Tnichoderma viride, Oidium spp., Akernaria spp., Akernaria alternata, Alternania tenuis, Hehninrhosporium spp., Helininthosporium gramineum, Helininthosporium sativum, Hehninrhosporium teres, Aspergilius spp., Aspergillus ochiaseus, Aspergillus nidulans, Aspergillus versicolor, Aspergillus wentli Group, Aspergillus candidus, Aspergillus flavus, Aspergillus niger, Aspergillus oryzae strain ATCC 14156, Penidillum spp., Penicillum aculeatum, Penicillum citninum, Penicillum claviforme, Penicillum funiculosum, Penicillum italicum, Penicillum lanoso-viride, Penicilium emersonli, Penicillum lilacinum, Penicillum expansum and mixtures thereof.

35. A method for the preparation of a malted cereal as recited in claim 32, 33 or 34 wherein the malting cereal composition is held with water at a temperature of from about 5° C. to about 30° C. for a time effective for providing a wetted cereal having a moisture content of at least about 20 weight percent.

36. A method for the preparation of a malted cereal as recited in claim 35 wherein the malting cereal composition is held for about 2 to about 7 days.

37. A method as recited in claim 36 wherein, the activated spores are activated by treatments selected from the group consisting of
cycles of wetting and drying,
addition of nutritional supplies,
exposure to temperature changes within a range of about 0° to about 80° C., exposure to changes in pH within a pH range of about 2.0 to about 8.0 to obtain spores where the size of the spores is increased by a factor between about 1.2 and about 10 over their dormant size and/or the spores have one or more germ tubes per spore, and mixtures thereof.

38. A method as recited in claim 37 wherein the cereal is barley.

39. A method as recited in claim 32, 33, or 34 wherein the cereal is barley.

40. A method for the preparation of a malted cereal, the method comprising:
mixing water, activated spores and a cereal to provide a making cereal composition, the activated spores being present in an amount of about $1 \times 10^2$ to about $1 \times 10^7$ per gram of air dry cereal to provide a malted cereal, the amount of activated spores being effective for providing the malted cereal with an increased enzyme activity, the increased enzyme activity being greater than the enzyme activity which is obtained by a malting process dormant spores.

41. A method as recited in claim 40 wherein the activated spores are from the microbes selected from the group consisting of Micrococcus spp., Streptococcus spp., Leuconostoc spp., Pediococcus spp., Pediococcus halophilus, Pediococcus cerevisiae, Pediococcus damnosus, Pediococcus hemophilus, Pediococcus parvulus, Pediococcus soyae, Lactococcus spp., Lactobacillus spp., Lactobacillus acidophilus, Lactobacillus amylovorus, Lactobacillus bavaricus, Lactobacifius bifermentans, Lactobacillus brevis var lindneri, Lactobacillus casei var casei, Lactobacillus delbrueckii, Lactobacillus delbrueckii var lactis, Lactobacillus delbrueckii var bulgaricus, Lactobacillus fermenti, Lactobacillus gasserii, Lactobacillus helveticus, Lactobacillus hilgardii, Lactobacillus renterii, Lactobacillus sake, Lactobacillus sativorius, Lactobacillus cremoris, Lactobacillus kefir, Lactobacillus pentoceticus, Lactobacillus cellobiosus, Lactobacilius bruxellensis, Lactobacillus buchnerii, Lactobacillus coryneformis, Lactobacillus confusus, Lactobacillus florentinus, Lactobacillus viridescens, Corynebacterium spp., Propionibacterium spp., Bifidobacterium spp., Streptomyces spp., Bacillus spp., Sporolactobacillus spp., Acetobacter spp., Agrobacterium spp., Alcaligenes spp., Pseudomonas spp., Pseudomonas amylophilia, Pseudomonas aeruginosa, Pseudomonas cocovenenans, Pseudomonas mexicana, Pseudomonas pseudomallei, Gluconobacter spp., Enterobacter spp., Erwinia spp., Kiebsiella spp., Proteus spp., Ascomycota, Dothideales, Mycosphaerellaceae, Mycosphaerella spp., Venturiaceae, Venturia spp., Eurotiales, Monascaceae, Monascus spp., Trichocomaceae, Emericilla spp., Euroteum spp., Eupenicilhium spp., Neosarrorya spp., Talaromyces spp., Hypocreales, Hypocreceae, Hypocrea spp., Saccharomycetales, Dipodascaceae, Dipodascus spp., Galactomyces spp., Endomycetaceae, Endomyces spp., Metschnikowiaceae, Guilliermondella spp., Saccharomycetaceae, Debaryoinyces spp., Dekkera spp., Pichia spp., Kluyveromyces spp., Saccharomyces spp., Torulaspora spp., Zygosaccharomyces spp., Saccharomycodaceae, Hanseniaspora spp.; Scbizosaccharomycetales, Schizosaccharomycetaceae, Schizosaccharomyces spp., Sordariales, Chaetoniiaceae, Chaetontium spp., Sordariacea, Neurospora spp., Zygomycota, Mucorales, Mucoraceae, Absidia spp., Amylomyces spp., Rbizomucor spp., Actinomucor spp., Thermomucor spp., Chiamydomucor spp., Mucor spp., Mucor circinelloides, Mucor grisecyanus, Mucor hiemalis, Mucor mdlicus, Mucor mucedo, Mucor piriformis, Mucor plumbeus, Mucor praini, Mucor pusilius, Mucor silvaticus, Mucor javanicus, Mucor racemosus, Mucor rouxianus, Mucor rouxil, Mucor arornaticus, Mucor flavus, Mucor miehei, Rhizopus spp., Rhizopus arrbizus, Rhizopus oligosporus, Rhizopus oryzae, Rhizopus oryzae strain ATCC 4858, Rhizopus oryzae strain ATCC 9363, Rhizopus oryzae strain NRRL 1891, Rhizopus oryzae strain NRRL 1472, Rhizopus stolonifer, Rhizopus thailandensis, Rhizopus formosaensis, Rhizopus chinensis, Rhizopus colinli, Rhizopus japonicus, Rhizopus nodosus, Rhizopus delemar, Rhizopus acerorinus, Rhizopus chiamydosporus, Rhizopus circinans, Rhizopus javanicus, Rhizopus peka, Rhizopus saito, Rhizopus tritici, Rhizopus niveus, Rhizopus niicrosporus, Mitosporic fungi, Aureobasidium spp., Acremonium spp., Cercospora spp., Epicoccum spp., Monilia spp., Monilia candida, Monilia sitophila, Mycoderma spp., Candida spp., Candida diddensiae, Candida edax, Candida etcheilsil, Candida kefir, Candida krisei, Candida lactosa, Candida lambica, Candida melinji, Candida utilis, Candida milleri, Candida mycoderma, Candida parapsiosis, Candida obtux, Candida tropicalis, Candida valida, Canclida versatilis, Candida guilliermondii, Rhodotorula spp., Torulopsis spp., Geotrichum spp., Geotrichum amycelium, Geotrichurn armillariae, Geotrichum asteroides, Geotrichum bipunctatum, Geotrichum dulcitum, Geotrichum eriense, Geotrichum fici, Geotrichum flavo-brunneum, Geotrichum fragrans, Georrichum gracile, Geotrichum heritum, Georrichurn ldebaknii, Geotrichum penicillatum, Geotrichum hirtum, Geotrichum pseudocandildum, Geotrichum rectangulatum, Geotrichum suaveolens, Geotrichum vanryiae, Geotrichum loubieri, Geotrichum microsporum, Cladosporium spp., Trichoderma spp., Trichoderma hamatum, Trichoderma harzianum, Trichoderma koningii, Trichoderma pseudokoningii, Trichoderma reesei, Trichoderma virgarum, Trichoderma viride, Cidium spp., Alternaria spp., Alternaria alternata, Alternaria tenuis, Helininthosporium spp., Helminthosporium gramineum, Helnilnthosporium sativum, Helminthosporium teres, Aspergillus spp., Aspergillus ocbraseus, Aspergillus nidulans, Aspergilius versicolor, Aspergillus wentil Group, Aspergillus candidus, Aspergillus flavus, Aspergillus niger, Aspergillus oryzae strain ATCC 14156, Penicillum spp., Penicillum aculeatum, Penicillum citrinum, Penicillum claviforme, Penicillum funiculosum, Pemciillum italicum, Penicillum lanoso-viride, Penicillum emersonii, Penicillum lilacinum, Penicillum expansum and mixtures thereof.

42. A method as recited in claim 40, wherein the activated spores increase an activity of an enzyme that is present in the malting cereal composition, said enzyme selected from the group of β-glucanase, xylanase, amylase, prorease, naturally occurring enzymes in the cereal and combinations thereof.

43. A method for the preparation of a malted cereal as recited in claim 41 or 42 wherein the malting cereal composition is held with water at a temperature of from about 5° C. to about 30° C. for a time effective for providing a wetted cereal having a moisture content of at least about 20 weight percent.

44. A method for the preparation of a malted cereal as recited in daim 43 wherein the malting cereal composition is held with water for about 2 to about 7 days.

45. A method as recited in claim 44 wherein the activated spores are activated by treatments selected from the group consisting of
cycles of wetting and drying,
addition of nutritional supplies,
exposure to temperature changes within a range of about 0° to about 80° C., exposure to changes in pH within a pH range of about 2.0 to about 8.0 to obtain spores where the size of the spores is increased by a factor between about 1.2 and about 10 over their dormant size and/or the spores have one or more germ tubes per spore, and mixtures thereof.

46. A method for the preparation of a malted cereal as recited in claim 45, wherein the activated spores are being present in an amount of from about $1 \times 10^2$ to about $1 \times 10^7$ per gram of air dry cereal.

47. A method for preparation of a malted cereal as recited in claim 43 wherein the cereal is barley.

48. A method for the preparation of a malted barley, the method comprising:
mixing activated spores, a barley and water to provide a malting barley composition, the activated spores being present in an amount of about $1 \times 10^2$ to about $1 \times 10^7$ per gram of air dry barley to provide a malting barley composition, the amount of activated spores being effective for providing an increased enzyme activity greater than the enzyme activity which is obtained by the same malting process which includes dormant spores and wherein the increased enzyme activity is selected from the group of β-glucanase, xylanase, amylase, Protease, naturally occurring enzymes in the barley and combinations thereof;
holding the malting barley composition at a temperature of from about 5° C. to about 30° C. for a time effective for providing a wetted barley having a moisture content of at least about 20 weight percent, and
wherein the activated spores are activated by treatments selected from the group consisting of
cycles of wetting and drying,
addition of nutritional supplies,
exposure to temperature changes within a range of about 0° to about 80° C., exposure to changes in pH within a pH range of about 2.0 to about 8.0 to obtain spores where the size of the spores is increased by a factor between about 1.2 and about 10 over their dormant size and/or the spores have one or more germ tubes per spore, and mixtures thereof.

49. A method for the preparation of a malted cereal as recited in claim 48 wherein, the malting barley composition is held with water for about 2 to about 7 days to provide a malted barley with a moisture content of from about 20 weight percent to about to about 60 weight percent.

50. A method for the preparation of a malted barley as recited in claim 48, wherein the activated spores are from the microbes selected from the group consisting of Micrococcus spp., Streptococcus spp., Leuconostoc spp., Pediococcus spp., Pediococcus halophilus, Pediococcus cerevisiae, Pediococcus damnosus, Pediococcus hemophilus, Pediococcus parvulus, Pecliococcus soyae, Lactococcus spp., Lactobacillus spp., Lactobacillus acidophilus, Lactobacillus amylovorus, Lactobacillus bavaricus, Lactobacillus bifermentans, Lactobacillus brevis var lindneri, Lactobacillus casei var casei, Lactobacillus deibrueckli, Lactobacillus deibrueckli var lactis, Lactobacilius delbrueckii var bulgaricus, Lactobacillus fermenti, Lactobacillus gasserli, Lactobacillus helveticus, Lactobacillus hilgardil, Lactobacillus renterii, Lactobacillus sake, Lactobacillus sativorius, Lactobacillus cremoris, Lactobacillus kefir, Lactobacillus penroceticus, Lactobacillus cellobiosus, Lactobacillus bruxellensis, Lactobacillus buchnerii, Lactobacillus coryneformis, Lactobacillus confusus, Lactobacillus florentinus, Lactobacillus viridescens, Corynebacrerium spp., Propionibacterium spp., Bifidobacterium spp., Streptomyces spp., Bacillus spp., Sporolactobacillus spp., Acetobacter spp., Agrobacrerium spp., Akaligenes spp., Pseudomonas spp., Pseudomonas amylophiia, Pseudomonas aeruginosa, Pseudomonas cocovenenans, Pseudomonas mexicana, Pseudomonas pseudomallei, Gluconobacrer spp., Enterobacter spp., Erwinia spp., Kiebsiella spp., Proteus spp., Ascomycora, Dothideales, Mycosphaerellaceae, Mycosphaerella spp., Venturiaceae, Venturia spp., Euroriales, Monascaceae, Monascus spp., Trichocomaceae, Emericilla spp., Euroteum spp., Eupenicillium spp., Neosarrorya spp., Talaromyces spp., Hypocreales, Hypocreceae, Hypocrea spp., Saccharomycerales, Dipodascaceae, Dipodascus spp., Galacromyces spp., Endomyceraceae, Endomyces spp., Merschnikowiaceae, Guilliermondella spp., Saccharomycetaceae, Debaryomyces spp., Dekkera spp., Pichia spp., Kluyveromyces spp., Saccharomyces spp., Torulaspora spp., Zygosaccharomyces spp., Saccharomycodaceae, Hanseniaspora spp.; Schizosaccharomycerales, Schizosaccharomyceraceae, Schizosaccharomyces spp., Sordariales, Chaetomiaceae, Chaetomium spp., Sordariacea, Neurospora spp., Zygomycora, Mucorales, Mucoraceae, Absidia spp., Amylomyces spp., Rhizomucor spp., Actinomucor spp., Thermomucor spp., Chiamydomucor spp., Mucor spp., Mucor circinelloides, Mucor grisecyanus, Mucor bleinalis, Mucor indicus, Mucor mucedo, Mucor piriformis, Mucor plumbeus, Mucor praini, Mucor pusillus, Mucor silvaticus, Mucorjavanicus, Mucor racemosus, Mucor rouxianus, Mucor rouxii, Mucor aromaticus, Mucor flavus, Mucor miehei, Rhizopus spp., Rhizopus arrhizus, Rhizopus oligosporus, Rhizopus oryzae, Rhizopus oryzae strain ATCC 4858, Rhizopus oryzae strain ATCC 9363, Rhizopus oryzae strain NRRL 1891, Rliizopus oryzae strain NRRL 1472, Rhizopus stolonifer, Rhizopus thailandensis, Rhizopus formosaensis, Rhizopus chinensis, Rhizopus cohnii, Rhizopus japonicus, Rhizopus nodosus, Rhizopus delemar, Rihizopus acetorinus, Rhizopus chiamydosporus, Rhizopus circinans, Rhizopus javanicus, Rhizopus peka, Rhizopus saito, Rhizopus tritici, Rhizopus niveus, Rhizopus microsporus, Mitosporic fungi, Aureobasidium spp., Acremonium spp., Cercospora spp., Epicoccum spp., Monilia spp., Monilia candida, Monilia sirophila, Mycoderma spp., Candida spp., Canclida diddensiae, Candida edax, Candida erchellsii, Candicla kefir, Candida krisei, Candida lactosa, Candida lambica, Candida inelinil, Candida urilis, Candida inilleri, Candida mycoderma, Candida parapsiosis, Candida obtux, Candida tropicalis, Candida valida, Canclida versarilis, Candida guilliermondli, Rhodotorula spp., Torulopsis spp., Geotrichum spp., Geotrichum amycelium, Geotrichum armillariae, Georrichum asteroides, Geotrichum bipunctatum, Geotrichum dulcitum, Geotrichum eriense, Geotrichum fici, Geotrichum flavo-brunneum, Georrichum fragrans, Geotrichum gracile, Geotrichum heritum, Geotrichum klebaknii, Geotrichum penicillatum, Geotrichum birtum, Geotrichum pseudocandidum, Geotrichum rectangulatum, Geotrichum suaveolens, Georrichum vanryiae, Georrichum loubieri, Geotrichum microsporum, Cladosporium spp., Trichoderrna spp., Thehoderma hamarum, Trichoderina harzianum, Tiachoderma koningii, Trichoderma pseudokoningli, Trichoderma reesei, Trichoderma virgatum, Trichoderma viride, Oidium spp., Alternaria spp., Altemaria alternata, Alternaria tenuis, Helminthosporium spp., Helminthosporium gramineum, Helminthosporium sativum, Helininthosporium teres, Aspergilius spp., Aspergillus ochraseus, AspergiJius nidulans, Aspergillus versicolor, Aspergiulus wentii Group, Aspergilius candidus, Aspergillus flavus, Aspergillus niger, Aspergillus oryzae strain ATCC 14156, Penicillum spp., Penicillum aculeatum, Penicillum citrinum, Penicillum claviforme, Penicillum funiculosum, Penicillum italicum, Penicillum lanoso-viride, Penicillum emersonji, Penicillum lilacinum, Penicillum expansum and mixtures thereof.

51. A method for the preparation of a malted barley, the method comprising:

mixing activated spores, a barley and water to provide a malting barley composition, the activated spores being present in an amount of about $1 \times 10^2$ to about to about $1 \times 10^7$ per gram of air dry barley to provide a malting barley composition, the amount of activated spores being effective for providing an increased enzyme activity greater than the enzyme activity which is obtained by the same making process which includes dormant spores and wherein the increased enzyme activity is selected from the group of β-glucanase, xylanase, amylase, Protease, naturally occurring enzymes in the barley and combinations thereof;

holding the malting barley composition at a temperature of from about 5° C. to about 30° C. for a time effective for providing a wetted barley having a moisture content of at least about 20 weight percent; and germinating the wetted barley in the presence of the activated spores for about 2 to about 7 days at a temperature between about 10° to about 30° C., to provide malted barely with the increased enzyme activity.

52. A method as recited in claim 51 wherein the combination is held until the barley germinates and after germination the barley is dried to a moisture content of not more than about 15 weight percent.

53. A method as recited in claim 51 wherein the method further comprises drying the combination and prior to the drying, the combination is held until the cereal has a moisture content of between about 20 to about 60 weight percent and the barley has germinated for about 2 to about 7 days at a temperature of from about 10 to about 30° C.

54. A method as recited in claim 51 wherein the process further comprises drying the combination and prior to drying, the combination is held until the cereal has a moisture content of between about 20 to about 60 weight percent and the cereal has germinated for about 2 to about 7 days at a temperature of from about 10 to about 30° C.; and after the germination, the combination is dried to a moisture content of from about 2 to about 15 weight percent.

55. A method as recited in claim 51 wherein the activated spores are from the microbes selected from the group consisting of Micrococcus spp., Streptococcus spp., Leuconostoc spp., Pediococcus spp., Pediococcus halophilus, Pediococcus cerevisiae, Pediococcus damnosus, Pediococcus hemophilus, Pediococcus parvulus, Pediococcus soyae, Lactococcus spp., Lactobacillus spp., Laceobacillus acidophilus, Lactobacillus amylovorus, Lactobacillus bavaricus, Lactobacfllus bifermentans, Lactobadillus brevis var lincineri, Lactobacillus casei var casei, Lactobacillus deibrueckil, Lactobacillus delbrueckii var lactis, Lactobacillus deibrueckil var bulgaricus, Lactobacilius fermenti, Lactobadillus gasserii, Lactobacillus helveticus, Lactobacillus hilgardil, Lactobacillus renterii, Lactobacillus sake, Lactobacillus sativorius, Lactobacillus cremoris, Laccobacilius kefir, Lactobacillus pentoceticus, Lactobacillus cellobiosus, Lactobacillus bruxellensis, Lactobacillus buchnerii, Lactobacillus coryneformis, Lactobacillus confusus, Lactobacillus florentinus, Lactobacifius viridescens, Corynebacterium spp., Propionibacterium spp., Bifidobaceerium spp., Streptomyces spp., Bacillus spp., Sporolactobacillus spp., Acetobacter spp., Agrobacterium spp., Alcaligenes spp., Pseudomonas spp., Pseudomonas amylophilia, Pseudomonas aeruginosa, Pseudomonas cocovenenans, Pseudomonas mexicana, Pseudomonas pseudomallei, Gluconobacter spp., Enterobacter spp., Erwinia spp., Kiebsiella spp., Proteus spp., Ascomycota, Dothideales, Mycosphaerellaceae, Mycosphaerelia spp., Venturiaceae, Venturia spp., Eurotiales, Monascaceae, Monascus spp., Trichocomaceae, Emericilla spp., Euroteum spp., Eupenicillium spp., Neosartorya spp., Talaromyces spp., Hypocreales, Hypocreceae, Hypocrea spp., Saccharomycetales, Dipodascaceae, Dipodascus spp., Galactomyces spp., Endomycetaceae, Endomyces spp., Metschnikowiaceae, Guilliermondella spp., Saccharoinycetaceae, Debaryomyces spp., Dekkera spp., Pichia spp., Kinyveromyces spp., Saccharomyces spp., Toruloaspora spp., Zygosaccharomyces spp., Saccharomycodaceae, Hanseniaspora spp.; Schizosaccharomycetales, Schizosaccharomycetaceae, Schizosaccharomyces spp., Sordariales, Chaetomiaceae, Chaeromium spp., Sordariacea, Neurospora spp., Zygomycota, Mucorales, Mucoraceae, Absidia spp., Amylomyces spp., Rhizomucor spp., Actinomucor spp., Thermomucor spp., Chiamydomucor spp., Mucor spp., Mucor circinelloides, Mucor grisecyanus, Mucor hiemalis, Mucor indicus, Mucor mucedo, Mucor piriformis, Mucor plumbeus, Mucor praini, Mucor pusilius, Mucor silvaticus, Mucor javanicus, Mucor racemosus, Mucor rouxianus, Mucor rouxit, Mucor aromaticus, Mucor flavus, Mucor miehei, Rhizopus spp., Rhizopus arrhizus, Rhizopus oligosporus, Rhizopus oryzae, Rhizopus oryzae strain ATCC 4858, Rhizopus oryzae strain ATCC 9363, Rhizopus oryzae strain NRRL 1891, Rhizopus oryzae strain NRRL 1472, Rhizopus stolonifer, Rhizopus thailandensis, Rhizopus formosaensis, Rhizopus chinensis, Rhizopus cohnii, Rhizopus japonicus, Rhizopus nodosus, Rhizopus delemar, Rhizopus acetorinus, Rhizopus chiamydosporus, Rhizopus circinans, Rhizopus javanicus, Rhizopus peka, Rhizopus saito, Rhizopus tritici, Rhizopus niveus, Rhizopus microsporus, Mitosporic fungi, Aureobasidiurn spp., Acremonium spp., Cercospora spp., Epicoccuin spp., Monilia spp., Monilia candida, Monilia sitophila, Mycoderma spp., Candida spp., Candida diddensiae, Candida edax, Candida ercheilsil, Candida kefir, Candida krisei, Candida lactosa, Candida lambica, Candida mebnii, Candida utilis, Candida mullen, Candida inycoderma, Candida parapsiosis, Candida obrux, Candida tropicalis, Candida valida, Candida versatilis, Candida guilliermondil, Rhodotorula spp., Torulopsis spp., Geotnichumspp., Geotnichum amycelium, Geotnichum armillariae, Geotrichum asteroides, Geotnichum bipunctatum, Geotnichuin dulcitum, Geotnichum eriense, Geotrichum fici, Geotrichum flavo-brunneuin, Geotnichum fragrans, Geornichum gracile, Geotrichuin henitum, Geornichum klebaknii, Geotrichum penicillarum, Georrichum hirrum, Geornichum pseudocandidum, Georrichum recrangularum, Geotnichum suaveolens, Geotnichum vanryiae, Geotnichum loubieri, Geotnichum microsporum, Cladosponium spp., Trichoderma spp., Trichoderina hamatum, Trichoderma harzianum, Trichoderma koningli, Trichoderma pseudokoningui, Trichoderma reesei, Trichoderma virgatum, Trichoderma vinide, Qidluin spp., Alternaria spp., Alternania akernata, Akernania tenuis, Helminthosporium spp., Helminthosporium grainineum, Helminthosporium sativum, Helininthosponium teres, Aspergillus spp., Aspergillus ochraseus, Aspergillus nidulans, Aspergilius versicolor, Aspergillus wentli Group, Aspergillus candidus, Aspergillus flavus, Aspergillus niger, Aspergillus oryzae strain ATCC 14156, Penicifium spp., Penicillum aculeatum, Penicillum citrinum, Penicillum claviforme, Penicillum funiculosum, Penicillum italicum, Penicillum lanoso-viride, Penicillum emersonli, Penicillum lilacinum, Penicillum expansum and mixtures thereof.

56. A method for the preparation of a malted cereal product, the method comprising:
mixing water, activated spores and a cereal to provide a malting cereal composition, the activated spores being present in the malting cereal composition in an amount of at least about $1 \times 10^2$ per gram of air dry cereal, the amount of activated spores being effective for providing the malted cereal with the increased enzyme activity, the increased enzyme activity being greater than the enzyme activity which is obtained by the same making process with dormant spores.

57. A method as recited in claim 56, wherein said enzyme is selected from the group of B-glucanase, xylanase, amylase, a protease, naturally occurring enzymes in the cereal and combinations thereof.

58. A method as recited in claim 56 wherein the combination is held for a time and temperature until the cereal has a moisture content of at least about 20 weight percent.

59. A method as recited in claim 56, wherein the combination is held until the cereal germinates and after germination the cereal is dried to a moisture content of not more than about 15 weight percent.

60. A method as recited in claim 56 wherein the process further comprises drying the combination and prior to the drying, the combination is held until the cereal has a moisture content of between about 20 to about 60 weight percent and the cereal has germinated for about 2 to about 7 days at a temperature of from about 10 to about 30° C.

61. A method as recited in claim 56 wherein the process further comprises drying the combination and prior to drying, the combination is held until the cereal has a moisture content of between about 20 to about 60 weight percent and the cereal has germinated for about 2 to about 7 days at a temperature of from about 10 to about 30° C.; and
after the germination, the combination is dried to a moisture content of from about 2 to about 15 weight percent.

62. A method as recited in claim 56 wherein the activated spores are from the microbes selected from the group consisting of Micrococcus spp., Streptococcus spp., Leuconostoc spp., Pecliococcus spp., Pediococcus halophilus, Pediococcus cerevisiae, Pediococcus damnosus, Pediococcus hemophilus, Pecliococcus parvulus, Pediococcus soyae, Lactococcus spp., Lactobacillus spp., Lactobacillus acidophilus, Lactobacillus amylovorus, Lactobacillus bavaricus, Lactobacillus bifermentans, Lactobacillus brevis var lindneri, Lactobacillus casei var casei, Lactobacillus delbrueckii, Lactobacillus deibrueckli var lactis, Lactobacillus delbrueckii var bulgaricus, Lactobacillus fermenti, Lactobacillus gasserli, Lactobacillus helveticus, Lactobacillus bilgardii, Lactobacillus renterii, Lactobacillus sake, Lactobacillus sativorius, Lactobacillus cremoris, Lactobacillus kefir, *Lactobacillus pentoceticus, Lactobacillus cellobiosus, Lactobacillus bruxellensis, Lactobacillus buchnerii, Lactobacillus corynefornils, Lactobacillus confusus, Lactobacilius florentinus, Lactobacillus viridescens, Corynebacterium* spp., *Propionibacterium* spp., *Bifidobacterium* spp., *Streptomyces* spp., *Bacillus* spp., *Sporolactobacillus* spp., *Acetobacter* spp., *Agrobacterium* spp., *Alcaligenes* spp., *Pseudomonas* spp., *Pseudomonas amylophilia, Pseudomonas aeruginosa, Pseudomonas cocovenenans, Pseudomonas mexicana, Pseudomonas pseudomallei, Gluconobacter* spp., *Enterobacter* spp., *Erwinia* spp., *Kiebsiella* spp., *Proteus* aspp., *Ascomycota, Dothideales, Mycosphaerellaceae, Mycosphaerella* spp., *Venturiaceae, Venturia* spp., *Eurotiales, Monascaceae, Monascus* spp., *Trichocomaceae, Emericilla* spp., *Euroteum* spp., *Eupenicillium* spp., *Neosartorya* spp., *Talaromyces* spp., *Hypocreales, Hypocreceae, Hypocrea* spp., *Saccharomycetales, Dipodascaceae, Dipodascus* spp., *Galactomyces* spp., *Endomycetaceae, Endomyces* spp., *Metschnikowiaceae, Guilliermondella* spp., *Saccharomycetaceae, Debaryomyces* spp., *Dekkera* spp., *Pichia* spp., *Kluyveromyces* spp., *Saccharomyces* spp., *Torulaspora* spp., *Zygosaccharomyces* spp., *Saccharomycodaceae, Hanseniaspora* spp.; *Schizosaccharomycetales, Schizosaccharomycetaceae, Schizosaccharomyces* spp., *Sordariales, Chaetomiaceae, Chaetomium* spp., *Sordariacta, Neurospora* spp., *Zygomycota, Mucorales, Mucoraceae, Absidia* spp., *Amylomyces* spp., *Rhizomucor* spp., *Actinomucor* spp., *Thermomucor* spp., *Chiamydomucor* spp., *Mucor* spp., *Mucor circinelloides, Mucor grisecyanus, Mucor hiemalis, Mucor indicus, Mucor mucedo, Mucor piriformis, Mucor plumbeus, Mucor praini, Mucor pusilius, Mucor silvaticus, Mucor javanicus, Mucor racemosus, Mucor rouxianus, Mucor rouxii, Mucor aromaticus, Mucor flavus, Mucor miehei, Rhizopus* spp., *Rhizopus arrhizus, Rhizopus oligosporus, Rhizopus oryzae, Rhizopus oryzae* strain ATCC 4858, *Rhizopus oryzae* strain ATCC 9363, *Rhizopus oryzae* strain NRRL 1891, *Rhizopus oryzae* strain NRRL 1472, *Rhizopus stolonifer, Rhizopus thailandensis, Rhizopus formosaensis, Rhizopus chinensis, Rhizopus cohnii, Rhizopus japonicus, Rhizopus nodosus, Rhizopus delemar, Rhizopus acetorinus, Rhizopus chiamydosporus, Rhizopus circinans, Rhizopus javanicus, Rhizopus peka, Rhizopus saito, Rhizopus tritici, Rhizopus niveus, Rhizopus microsporus, Mitosporic fungi, Aureobasidium* spp., *Acremomum* spp., *Cercospora* spp., *Epicoccum* spp., *Monilia* spp., *Monilia candida, Monilia sitophila, Mycoderma* spp., *Candida* spp., *Candida diddensiae, Candida edax, Candida etchelisli, Candida kefir, Candida krisei, Candida lactosa, Candida lambica, Candida melinil, Candida utilis, Candida milleri, Candida mycoderma, Candida parapsiosis, Candida obtux, Candida tropicalis, Candida valida, Candida versatilis, Candida guilliermondli, Rhodotorula* spp., *Torulopsis* spp., *Geotrichum* spp., *Geocrichum amycelium, Geotrichum arnAlariae, Geotrichum asteroides, Geotrichum bipunctatum, Geotrichum dulcitum, Geotrichum eriense, Geotrichum fici, Geotrichum flavo-brunneum, Geotrichum fragrans, Geotrichum gracile, Geotrichum heritum, Georrichum kiebakuji, Geotrichum penicillatum, Georrichum hirtum, Geotrichum pseudocandidum, Geotrichum rectangulatum, Geotrichum suaveolens, Geotrichum vanryiae, Geotrichum loubieri, Geotrichum Inicrosporum, Cladosporium* spp., *Trichoderma* spp., *Trichoderma hamatum, Trichoderma haizianum, Trichoderma koningil, Trichoderma pseudokoningii, Trichoderma reesei, Trichoderma virgatum, Trichoderma viride, Oidium* spp., *Alternaria* spp., *Altemaria alternata, Altemaria tenuis, Helminthosporium* spp., *Helminthosporium gramineuin, Helininthosporium sativum, Helminthosporium teres, Aspergillus* spp., *Aspergillus ochiaseus, Aspergilius nidulans, Aspergillus versicolor, Aspergillus wentii Group, Aspergillus candidus, Aspergillus flavus, Aspergillus niger, Aspergillus oryzae* strain ATCC 14156, *Penicillum* spp., *Penicillum aculeatum, Penicillum citrinum, Penicillum claviforme, Penicillum funiculosum, Penicillum italicum, Penicillum lanoso-viride, Penicillum emersonji, Penicillum hilacinum, Penicillum expansum* and mixtures thereof.

63. A method for the preparation of a malted barley, the method comprising:

mixing activated spores, a barley and water to provide a making barley composition, the activated spores being present in an amount of at least about $1 \times 10^2$ per gram of air dry barley to provide a malting barley composition, the amount of activated spores being effective for providing an increased enzyme activity greater than the enzyme activity which is obtained by the same making process which includes dormant spores and wherein the increased enzyme activity is selected from the group of β-glucanase, xylanase, amylase, Protease, naturally occurring enzymes in the barley and combinations thereof;

holding the making barley composition at a temperature of from about 5° C. to about 30° C. for a time effective for providing a wetted barley having a moisture content of at least about 20 weight percent; and germinating the wetted barley in the presence of the activated spores for about 2 to about 7 days at a temperature between about 10° to about 30° C., to provide malted barely with the increased enzyme activity.

64. A method as recited in claim 63 wherein the combination is held until the barley germinates and after germination the barley is dried to a moisture content of not more than about 15 weight percent.

65. A method as recited in claim 63 wherein the process further comprises drying the combination and prior to the drying, the combination is held until the barely has a moisture content of between about 20 to about 60 weight percent and the barley has germinated for about 2 to about 7 days at a temperature of from about 10 to about 30° C.

66. A method as recited in claim 63 wherein the process further comprises drying the combination and prior to drying, the combination is held until the barley has a moisture content of between about 20 to about 60 weight percent and the barley has germinated for about 2 to about 7 days at a temperature of from about 10 to about 30° C.; and after the germination, the combination is dried to a moisture content of from about 2 to about 15 weight percent.

67. A method as recited in claim 63 wherein the activated spores are from the microbes selected from the group consisting of *Micrococcus* spp., *Streptococcus* spp., *Leuconostoc* spp., *Pediococcus* spp., *Pediococcus halophilus, Pecliococcus cerevisiae, Pediococcus damnosus, Pediococcus hemophilus, Pediococcus parvulus, Pediococcus soyae, Lactococcus* spp., *Lactobacilius* spp., *Lactobacilius acidophilus, Lactobacillus amylovorus, Lactobacillus bavaricus, Lactobacillus bifermentans, Lactobacillus brevis var lindneri, Lactobacillus casei var casel, Lactobacillus delbrueckii, Lactobacillus delbrueckii var lactis, Lactobacilius delbrueckii var bulgaricus, Lactobacillus fermenti, Lactobacillus gasserii, Lactobacillus helveticus, Lactobadillus hilgardii, Lactobacillus renterli, Lactobacillus sake, Lactobacillus sativorius, Lactobacillus cremoris, Lactobacilius kefir, Lactobacillus pentoceticus, Lactobacillus cellobiosus,*

*Lactobacillus bruxellensis, Lactobacillus buchnerli, Lactobacillus coryneformis, Lactobacillus confusus, Lactobacillus florentinus, Lactobacillus viridescens, Corynebacterium* spp., *Propionibacterium* spp., *Bifidobacterium* spp., *Streptomyces* spp., *Bacillus* spp., *Sporolactobacillus* spp., *Acerobacter* spp., *Agrobacterium* spp., *Alcaligenes* spp., *Pseudomonas* spp., *Pseudomonas arnylophilia, Pseudomonas aeruginosa, Pseudoinonas cocovenenans, Pseudomonas mexicana, Pseudomonas pseudoinallei, Gluconobacter* spp., *Enrerobacter* spp., *Erwinia* spp., *Kiebsiella* spp., *Proteus* spp., *Ascomycora, Dotbideaks, Mycosphaerellaceae, Mycosphaerelia* spp., *Venturiaceae, Venruria* spp., *Eurotiales, Monascaceae, Monascus* spp., *Trichocomaceae, Emericilla* spp., *Euroteum* spp., *Eupenicillium* spp., *Neosartorya* spp., *Talarotnyces* spp., *Hypocreales, Hypocreceae, Hypocrea* spp., *Saccharomycetales, Dipodascaceae, Dipodascus* spp., *Galacromyces* spp., *Endomyceraceae, Endomyces* spp., *Metschnikowiaceae, Guilliermondella* spp., *Saccharomycetaceae, Debaryomyces* spp., *Dekkera* spp., *Pichia* spp., *Kluyveromyces* spp., *Saccharomyces* spp., *Toridaspora* spp., *Zygosaccharomyces* spp., *Saccharomycodaceae, Hanseniaspora* spp.; *Scbizosaccharomycerales, Schizosaccharomycetaceae, Schizosaccharomyces* spp., *Sordariales, Chaetomiaceae, Chaetomium* spp., *Sordariacea, Neurospora* spp., *Zygomycota, Mucorales, Mucoraceae, Absidia* spp., *Amylomyces* spp., *Rhizomucor* spp., *Actinomucor* spp., *Thermomucor* spp., *Chiamydomucor* spp., *Mucor* spp., *Mucor circinelloides, Mucor grisecyanus, Mucor biemalis, Mucor indicus, Mucor mucedo, Mucor piriforinis, Mucor plumbeus, Mucor praini, Mucor pusillus, Mucor silvaticus, Mucor javanicus, Mucor racemosus, Mucor rouxianus, Mucor rouxil, Mucor aromaticus, Mucor flavus, Mucor miehei, Rhizopus* spp., *Rhizopus arrbizus, Rhizopus oligosporus, Rhizopus oryzae, Rhizopus oryzae* strain ATCC 4858, *Rhizopus oryzae* strain ATCC 9363, *Rhizopus oryzae* strain NRRL 1891, *Rhizopus oryzae* strain NRRL 1472, *Rhizopus stolonifer, Rhizopus thailandensis, Rhizopus formosaensis, Rhizopus chinensis, Rhizopus cohnii, Rhizopus japonicus, Rhizopus nodosus, Rhizopus delemar, Rhizopus acetorinus, Rhizopus chiamydosporus, Rhizopus circinans, Rhizopus javanicus, Rhizopus peka, Rhizopus saito, Rhizopus tritici, Rhizopus niveus, Rhizopus microsporus, Mirosporic fungi, Aureobasidium* spp., *Acremonium* spp., *Cercospora* spp., *Epicoccum* spp., *Monilia* spp., *Monilia candida, Monilia sitophila, Mycoderma* spp., *Candida* spp., *Candida diddensiae, Candida edax, Candida etcheilsil, Candida kefir, Candida krisei, Candida lactosa, Candida lambica, Candida melinil, Canada utilis, Candida milleri, Candida mycoderma, Candida parapsiosis, Candida obtux, Candida tropicalis, Candida valida, Candida versatilis, Candida guilliermondil, Rhodotorula* spp., *Torulopsis* spp., *Geotrichum* spp., *Geotrichum amycelium, Geotrichum armillariae, Geotrichum asteroides, Geotrichum bipuncratum, Geotrichum dulcitum, Geotrichuin eriense, Geotrichum fici, Geotrichum flavo-brunneum, Geotrichuin fragrans, Geotrichum gracile, Geotrichum herirum, Geotrichum klebaknii, Geotrichum penicillarum, Geotrichum hirtum, Geotrichum pseudocanclidum, Geotrichum rectangularum, Georrichum suaveolens, Georrichum vanryiae, Geotrichum loubieri, Geotrichum microsporum, Cladosporiuin eeps., Trichoderma* spp., *Trichoderma hamatum, Trichoderma harzianum, Trichoderma koningil, Trichoderma pseudokoningli, Trichoderma reesei, Trichoderma virgatum, Trichoderma viride, Qidium* spp., *Ahemaria* spp., *Akernaria alternata, Alternaria renuis, Helininthosporium* spp., *Helminthosporium gramineum, Helminthosporium sadvum, Helminthosporium teres, Aspergillus* spp., *Aspergillus ochraseus, Aspergillus nidulans, Aspergillus versicolor, Aspergillus wentli Group, Aspergillus candidus, Aspergillus flavus, Aspergillus niger, Aspergillus oryzae* strain ATCC 14156, *Penicillum* spp., *Penicillum aculeatum, Penicillum citrinum, Penicillum claviforme, Penicillum funiculosum, Penicillum italicum, Penicillum lanoso-viride, Penicillum emersonji, Penicillum lilacinum, Penicillum expansum* and mixtures thereof.

* * * * *